United States Patent
Sun et al.

(10) Patent No.: US 9,825,950 B2
(45) Date of Patent: Nov. 21, 2017

(54) METHOD, APPARATUS, AND SYSTEM FOR CONTROLLING ACCESS OF USER TERMINAL

(71) Applicant: Huawei Technologies Co., Ltd., Shenzhen (CN)

(72) Inventors: Bing Sun, Nanjing (CN); Yibin Xu, Nanjing (CN); Penghe Tang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 202 days.

(21) Appl. No.: 14/991,555

(22) Filed: Jan. 8, 2016

(65) Prior Publication Data

US 2016/0127368 A1 May 5, 2016

Related U.S. Application Data

(63) Continuation of application No. PCT/CN2014/081326, filed on Jul. 1, 2014.

(30) Foreign Application Priority Data

Jul. 9, 2013 (CN) .......................... 2013 1 0286753

(51) Int. Cl.
*H04L 29/06* (2006.01)
*H04W 12/06* (2009.01)
(Continued)

(52) U.S. Cl.
CPC ...... *H04L 63/0876* (2013.01); *H04L 61/6022* (2013.01); *H04L 63/102* (2013.01);
(Continued)

(58) Field of Classification Search
CPC ............... H04L 63/0876; H04L 63/102; H04L 61/6022; H04L 67/141; H04W 12/08; H04W 12/06
See application file for complete search history.

(56) References Cited

U.S. PATENT DOCUMENTS

| | | |
|---|---|---|
| 2007/0071016 A1 | 3/2007 | Sadot |
| 2008/0101240 A1 | 5/2008 | Rohilla et al. |

(Continued)

FOREIGN PATENT DOCUMENTS

| | | |
|---|---|---|
| CN | 101217575 A | 7/2008 |
| CN | 101621802 A | 1/2010 |

(Continued)

OTHER PUBLICATIONS

Machine Translation and Abstract of Chinese Publication No. CN101621802, Jan. 6, 2010, 16 pages.
(Continued)

*Primary Examiner* — Anthony Brown
*Assistant Examiner* — William Corum, Jr.
(74) *Attorney, Agent, or Firm* — Conley Rose, P.C.

(57) ABSTRACT

A method, an apparatus, and a system for controlling access of a user terminal, where the method includes receiving, by a controller, an authentication packet sent by an access switching node through an established data tunnel; obtaining, by the controller, a source media access control (MAC) address of the authentication packet; after access authentication implemented on a user terminal, determining, from a maintained correspondence between MAC addresses of user terminals and interface identifiers, an interface identifier corresponding to the MAC address of the successfully-authenticated user terminal, where the interface identifier identifies an interface connected to the user terminal; and sending, by the controller, the determined interface identifier
(Continued)

to the access switching node through an established control tunnel, and instructing the access switching node to enable the interface corresponding to the interface identifier.

10 Claims, 11 Drawing Sheets

(51) Int. Cl.
  *H04W 12/08* (2009.01)
  *H04L 29/12* (2006.01)
  *H04L 29/08* (2006.01)

(52) U.S. Cl.
  CPC .......... *H04L 67/141* (2013.01); *H04W 12/06* (2013.01); *H04W 12/08* (2013.01)

(56) References Cited

U.S. PATENT DOCUMENTS

| | | | | |
|---|---|---|---|---|
| 2009/0259755 | A1* | 10/2009 | Boucachard | H04L 12/4633 709/227 |
| 2013/0083691 | A1* | 4/2013 | Murphy | H04W 12/06 370/254 |
| 2013/0083724 | A1* | 4/2013 | Sindhu | H04L 12/4633 370/328 |
| 2014/0071969 | A1* | 3/2014 | Roeland | H04W 76/026 370/338 |
| 2014/0092884 | A1* | 4/2014 | Murphy | H04L 69/03 370/338 |
| 2017/0201979 | A1* | 7/2017 | Murphy | H04W 72/0433 |

FOREIGN PATENT DOCUMENTS

| | | |
|---|---|---|
| CN | 101909059 A | 12/2010 |
| CN | 101980496 A | 2/2011 |
| CN | 102209319 A | 10/2011 |
| CN | 2012010235 A | 1/2012 |
| CN | 102572830 A | 7/2012 |
| CN | 102647715 A | 8/2012 |
| CN | 103118064 A | 5/2013 |
| JP | 2002314572 A | 10/2002 |
| JP | 2005252717 A | 9/2005 |
| JP | 2006033206 A | 2/2006 |
| JP | 2006067057 A | 3/2006 |
| JP | 2008060692 A | 3/2008 |
| JP | 2008278134 A | 11/2008 |
| JP | 2012010235 A | 1/2012 |
| JP | 2012080418 A | 4/2012 |
| WO | 2008034357 A1 | 3/2008 |
| WO | 2013039277 A1 | 3/2013 |

OTHER PUBLICATIONS

Machine Translation and Abstract of Chinese Publication No. CN102209319, Oct. 5, 2011, 15 pages.
Machine Translation and Abstract of Chinese Publication No. CN102572830, Jul. 11, 2012, 21 pages.
Machine Translation and Abstract of Chinese Publication No. CN102647715, Aug. 22, 2012, 14 pages.
Machine Translation and Abstract of Chinese Publication No. CN103118064, May 22, 2013, 14 pages.
Foreign Communication From a Counterpart Application, Chinese Application No. 201310286753.9, Chinese Office Action dated Feb. 13, 2017, 8 pages.
Partial English Translation and Abstract of Chinese Patent Application No. CN101980496, Dec. 25, 2015, 6 pages.
"Port-Based Network Access Control," IEEE Computer Society, Std 802.1X, Feb. 5, 2010, 222 pages.
Calhoun P., Ed., et al., "Control and Provisioning of Wireless Access Points (CAPWAP) Protocol Specification," RFC 5415, Mar. 2009, 155 pages.
Cheswick, et al,."Firewalls and Internet Security—2nd Edition," Jan. 1, 2003, 9 pages.
Foreign Communication From a Counterpart Application, European Application No. 14822073.4, Extended European Search Report dated Mar. 3, 2016, 9 pages.
Foreign Communication From a Counterpart Application, PCT Application No. PCT/CN2014/081326, English Translation of International Search Report dated Sep. 28, 2014, 2 pages.
Foreign Communication From a Counterpart Application, PCT Application No. PCT/CN2014/081326, Written Opinion dated Sep. 28, 2014, 10 pages.
Machine Translation and Abstract of Japanese Publication No. JP2006067057, Mar. 9, 2006, 20 pages.
Machine Translation and Abstract of Japanese Publication No. JP2008278134, Nov. 13, 2008, 15 pages.
Foreign Communication From a Counterpart Application, Japanese Application No. 2016-524665, Japanese Notice of Allowance dated Mar. 21, 2017, 3 pages.
Machine Translation and Abstract of Japanese Publication No. JP2012010235, Jan. 12, 2012, 53 pages.
Foreign Communication From A Counterpart Application, Korean Application No. 10-2016-7001224, Korean Notice of Allowance and English Translation dated Jul. 17, 2017, 3 pages.

* cited by examiner

DTLS Secured CAPWAP Data Packet:

CAPWAP Control Packet (DTLS Security Required):

METHOD, APPARATUS, AND SYSTEM FOR CONTROLLING ACCESS OF USER TERMINAL

CROSS-REFERENCE TO RELATED APPLICATIONS

This application is a continuation of International Application No. PCT/CN2014/081326, filed on Jul. 1, 2014, which claims priority to Chinese Patent Application No. 201310286753.9, filed on Jul. 9, 2013, both of which are hereby incorporated by reference in their entireties.

TECHNICAL FIELD

This application relates to the field of communications technologies, and in particular, to a method, an apparatus, and a system for controlling access of a user terminal.

BACKGROUND

In a communications system, a campus network generally refers to a network of a campus or an intranet of an enterprise, and a main feature of the campus network is that a router, a network switch, and the like disposed on the campus network are managed by a management organization (for example, an owner of the campus network).

As shown in FIG. 1, in a network architecture of a campus network, the campus network includes at least one user terminal and at least one network switch. Generally, a network switch that is located on a user terminal side and is directly connected to a user terminal may be called an access switch or an access switching node. Generally, a network switch that is located on a network side and is connected to an access switching node may be called an aggregation switch or an aggregation switching node. Each interface on an access switching node may not be connected to any user terminal, or may be connected to at least one user terminal. If a user terminal is connected to an access switching node, the user terminal may be connected to the access switching node in a wired manner. An interface on the other side of the access switching node is connected to an aggregation switching node, to implement packet transmission. In the network architecture of the campus network shown in FIG. 1, after a user terminal is successfully connected to an access switching node in a wired manner, authentication needs to be implemented before packet transmission to check whether the user terminal is allowed to access the campus network for packet transmission. The user terminal can send a packet to the access switching node only when the user terminal is allowed to access the campus network for packet transmission. Generally, there are two manners of implementing authentication to check whether a user terminal is allowed to access a campus network for packet transmission, to control whether the user terminal can access the campus network for packet transmission.

In a first manner, an access switching node implements authentication to check whether a user terminal is allowed to access a campus network for packet transmission. That is, the access switching node implements authentication on access of the user terminal, and determines, according to an authentication result, whether the user terminal is allowed to access the campus network for packet transmission. The network architecture of the campus network shown in FIG. 1 is used as an example, where a user terminal 1 and a user terminal 2 are connected to an access switching node 1 in a wired manner, a user terminal 3 is connected to an access switching node 2 in a wired manner, and both the access switching node 1 and the access switching node 2 are connected to an aggregation switching node. In implementation, the access switching node 1 implements authentication to check whether the user terminal 1 and the user terminal 2 are allowed to access the campus network, and the access switching node 2 implements authentication to check whether the user terminal 3 is allowed to access the campus network. The user terminal 1, the user terminal 2, or the user terminal 3 can access the network for packet transmission only when the authentication succeeds. When the first manner is used, each access switching node in a system needs to implement access authentication on a user terminal connected to the access switching node. However, generally, because there are many access switching nodes in the system, complexity of the network architecture used in the first manner is relatively high.

In a second manner, an aggregation switching node implements authentication on access of a user terminal. In the system architecture shown in FIG. 1, the aggregation switching node implements authentication on any user terminal in the system that is connected to an access switching node. If the authentication succeeds, the aggregation switching node allows all user terminals that are connected to the access switching node to access the network. That is, in this manner, after the access authentication implemented by the aggregation switching node on any user terminal connected to the access switching node succeeds, another user terminal connected to the access switching node does not require access authentication but is directly connected to the network for packet transmission using the access switching node. When the second manner is used, control over a single user terminal cannot be implemented, and security is poor.

In conclusion, an implementation manner of a common method for controlling access of a user terminal is relatively complex or security is relatively poor.

SUMMARY

The embodiments of this disclosure provides a method, an apparatus, and a system for controlling access of a user terminal, which can improve network security when an implementation procedure of access authentication implemented on a user terminal is simplified.

According to a first aspect, a method for controlling access of a user terminal is provided, where the method includes receiving, by a controller, an authentication packet sent by an access switching node through an established data tunnel; obtaining, by the controller, a media access control (MAC) address in a source MAC address field of the authentication packet; after access authentication implemented on a user terminal corresponding to the obtained MAC address succeeds, determining, from a maintained correspondence between a MAC address of a user terminal and an interface identifier, an interface identifier corresponding to the MAC address of the successfully-authenticated user terminal, where the interface identifier is an interface identifier of an interface on the access switching node connected to the user terminal; and sending, by the controller, the determined interface identifier to the access switching node through a control tunnel established between the controller and the access switching node, and instructing the access switching node to enable the interface corresponding to the interface identifier.

In a first possible implementation manner of the first aspect, before the access authentication is implemented on the user terminal corresponding to the MAC address, the correspondence between a MAC address of a user terminal and an interface identifier is determined in the following manner: receiving, by the controller, the MAC address of the user terminal sent by the access switching node through the control tunnel, and the interface identifier of the interface on the access switching node connected to the user terminal, where the MAC address of the user terminal and the interface identifier of the interface on the access switching node connected to the user terminal are obtained by the access switching node when the user terminal establishes a connection with the interface on the access switching node, and sends a packet through the connected interface; and establishing a correspondence between the MAC address of the user terminal and the interface identifier according to the received MAC address of the user terminal and the received interface identifier.

According to a second aspect, a method for controlling access of a user terminal is provided, where the method includes, when a MAC learning function is disabled, receiving, by an access switching node, an authentication packet sent by a user terminal that is connected to an interface on the access switching node; obtaining, by the access switching node, an interface identifier of the interface connected to the user terminal that sends the authentication packet, and obtaining a MAC address of the user terminal from the received authentication packet; sending, by the access switching node, the obtained MAC address of the user terminal and the obtained interface identifier to a controller through an established control tunnel, such that the controller maintains a correspondence between the received MAC address of the user terminal and the received interface identifier; receiving, by the access switching node, the interface identifier sent by the controller through the control tunnel, where the interface identifier is an interface identifier that is determined from the correspondence between the MAC address of the user terminal and the interface identifier after the controller successfully implements access authentication on the user terminal corresponding to the MAC address, and is corresponding to the MAC address of the successfully-authenticated user terminal; and enabling, by the access switching node according to the received interface identifier, the interface corresponding to the interface.

In a first possible implementation manner of the second aspect, the method further includes receiving, by the access switching node, an access permission that is of the user terminal corresponding to the MAC address and is sent by the controller through the control tunnel; and the enabling, by the access switching node according to the received interface identifier, the interface corresponding to the interface identifier includes configuring or modifying, according to a received access permission sent by an aggregation switching node, the access permission of the interface that is on the access switching node and corresponding to the interface identifier, to control the user terminal, which is connected to the interface, to access a network according to the access permission.

With reference to the second aspect or the first possible implementation manner of the second aspect, in a second possible implementation manner of the second aspect, the obtaining, by the access switching node, an interface identifier of the interface connected to the user terminal that sends the authentication packet, and obtaining a MAC address of the user terminal from the received authentication packet includes determining, by the access switching node, using a signal processor that is capable of performing a processing function according to program code, the interface identifier of the interface connected to the user terminal that sends the authentication packet, and transmitting the received authentication packet to the signal processor of the access switching node; and obtaining, by the signal processor from a source MAC address field of the authentication packet, the MAC address of the user terminal that sends the authentication packet.

According to a third aspect, an apparatus for controlling access of a user terminal is provided, where the apparatus includes a receiving module configured to receive an authentication packet sent through an established data tunnel, and transmit the received authentication packet to an obtaining module; the obtaining module configured to obtain the authentication packet transmitted by the receiving module, obtain a MAC address in a source MAC address field of the authentication packet, and transmit the obtained MAC address to an authentication module; the authentication module configured to receive the MAC address transmitted by the obtaining module, implement access authentication on a user terminal corresponding to the MAC address, and transmit a result of authentication success to a determining module; the determining module configured to obtain the result of authentication success transmitted by the authentication module; determine, from a maintained a correspondence between a MAC address of a user terminal and an interface identifier, an interface identifier corresponding to the MAC address of the successfully-authenticated user terminal, where the interface identifier is an interface identifier of an interface on an access switching node connected to the user terminal; and transmit the interface identifier to a sending module; and the sending module configured to obtain the interface identifier transmitted by the determining module, send the determined interface identifier to the access switching node through a control tunnel established between the controller and the access switching node, and instruct the access switching node to enable the interface corresponding to the interface identifier.

In a first possible implementation manner of the third aspect, the receiving module is further configured to receive the MAC address of the user terminal sent by the access switching node through the control tunnel, and the interface identifier of the interface on the access switching node connected to the user terminal, where the MAC address of the user terminal and the interface identifier of the interface on the access switching node connected to the user terminal are obtained by the access switching node when the user terminal establishes a connection with the interface on the access switching node, and sends a packet through the connected interface; and transmit the received MAC address and the received interface identifier to an establishing module; and the apparatus further includes the establishing module configured to obtain the MAC address and the interface identifier that are transmitted by the receiving module, and establish a correspondence between the MAC address of the user terminal and the interface identifier according to the received MAC address of the user terminal and the received interface identifier.

According to a fourth aspect, an apparatus for controlling access of a user terminal is provided, where the apparatus includes a receiving module configured to, when a MAC learning function is disabled, receive an authentication packet sent by a user terminal that is connected to an interface on the access switching node, and transmit the authentication packet to an obtaining module; the obtaining module configured to receive the authentication packet transmitted by the receiving module, obtain an interface identifier of the interface connected to the user terminal that sends the authentication packet, obtain a MAC address of the user terminal from the received authentication packet, and transmit the interface identifier and the MAC address to a sending module; the sending module configured to receive the interface identifier and the MAC address that are transmitted by the obtaining module, and send the obtained MAC address of the user terminal and the obtained interface identifier to a controller through a control tunnel established between the controller and the access switching node, such that the controller maintains a correspondence between the received MAC address of the user terminal and the received interface identifier, where the receiving module is further configured to receive the interface identifier sent by the controller through the control tunnel, and transmit the interface identifier to a control module, where the interface identifier is an interface identifier that is determined from the correspondence between the MAC address of the user terminal and the interface identifier after the controller successfully implements access authentication on the user terminal corresponding to the MAC address, and is corresponding to the MAC address of the successfully-authenticated user terminal; and the control module configured to obtain the interface identifier transmitted by the receiving module, and enable, according to the received interface identifier, the interface corresponding to the interface identifier.

In a first possible implementation manner of the fourth aspect, the receiving module is further configured to receive an access permission that is of the user terminal corresponding to the MAC address and is sent by the controller through the control tunnel, and transmit the access permission to the control module; and the control module is configured to obtain the access permission transmitted by the receiving module, and configure or modify, according to a received access permission sent by an aggregation switching node, the access permission of the interface that is on the access switching node and corresponding to the interface identifier, to control the user terminal, which is connected to the interface, to access a network according to the access permission.

With reference to the fourth aspect or the first possible implementation manner of the fourth aspect, in a second possible implementation manner of the fourth aspect, the obtaining module includes a signal processor, and is configured to determine the interface identifier of the interface connected to the user terminal that sends the authentication packet, and obtain the authentication packet transmitted by the receiving module; and the signal processor obtains, from a source MAC address field of the authentication packet, the MAC address of the user terminal that sends the authentication packet.

According to a fifth aspect, a system for controlling access of a user terminal is provided, where the system includes an aggregation switching node and an access switching node, where the access switching node is configured to, when a MAC learning function is disabled, receive an authentication packet sent by a user terminal that is connected to an interface on the access switching node, and send the authentication packet to the aggregation switching node through a data tunnel; obtain an interface identifier of the interface connected to the user terminal that sends the authentication packet, obtain a MAC address of the user terminal from the received authentication packet, and send the obtained MAC address of the user terminal and the obtained interface identifier to the aggregation switching node through a control tunnel; and receive the interface identifier sent by the aggregation switching node, and enable, according to the received interface identifier, the interface corresponding to the interface identifier; and the aggregation switching node is configured to receive the authentication packet sent by the access switching node through the established data tunnel, and obtain the MAC address in a source MAC address field of the authentication packet; and after access authentication implemented on the user terminal corresponding to the obtained MAC address succeeds, determine, from a maintained correspondence between a MAC address of a user terminal and an interface identifier, an interface identifier corresponding to the MAC address of the successfully-authenticated user terminal, where the interface identifier is the interface identifier of the interface on the access switching node connected to the user terminal; and send the determined interface identifier to the access switching node through the control tunnel established between the controller and the access switching node.

In a first possible implementation manner of the fifth aspect, the correspondence between a MAC address of a user terminal and an interface identifier is determined by the aggregation switching node in the following manner: receiving, by the aggregation switching node, the MAC address of the user terminal sent by the access switching node through the control tunnel, and the interface identifier of the interface on the access switching node connected to the user terminal, where the MAC address of the user terminal and the interface identifier of the interface on the access switching node connected to the user terminal are obtained by the access switching node when the user terminal establishes a connection with the interface on the access switching node, and sends a packet through the connected interface; and establishing a correspondence between the MAC address of the user terminal and the interface identifier according to the received MAC address of the user terminal and the received interface identifier.

With reference to the fifth aspect or the first possible implementation manner of the fifth aspect, in a second possible implementation manner of the fifth aspect, the access switching node is further configured to receive an access permission that is of the user terminal corresponding to the MAC address and is sent by the aggregation switching node through the control tunnel; and configure or modify, according to the received access permission sent by the aggregation switching node, the access permission of the interface that is on the access switching node and corresponding to the interface identifier, to control the user terminal, which is connected to the interface, to access a network according to the access permission.

With reference to any one of the fifth aspect, the first possible implementation manner of the fifth aspect, and the second possible implementation manner of the fifth aspect, in a third possible implementation manner of the fifth aspect, the access switching node is configured to determine, using a signal processor of the access switching node, the interface identifier of the interface connected to the user terminal that sends the authentication packet, and transmit the received authentication packet to the signal processor of the access switching node, such that the signal processor obtains, from the source MAC address field of the authentication packet, the MAC address of the user terminal that sends the authentication packet.

In the technical solutions provided in the embodiments of this disclosure, after access authentication implemented on a user terminal succeeds, an interface identifier corresponding to a MAC address of the successfully-authenticated user terminal is determined from an obtained correspondence between a MAC address of a user terminal and an interface identifier, the determined interface identifier is sent to an access switching node through a control tunnel established between the controller and the access switching node, and the access switching node is instructed to enable an interface corresponding to the interface identifier. In this way, access networks and network access permissions of user terminals can be controlled in a centralized manner, a system architecture is relatively simple and is easy to be implemented, and network security can be further improved.

DESCRIPTION OF EMBODIMENTS

For a common problem that an implementation manner of a method for controlling access of a user terminal is relatively complex or security is relatively poor, technical solutions are provided in embodiments of the present disclosure. In the technical solutions, after access authentication implemented on a user terminal succeeds, an interface identifier corresponding to a MAC address of the successfully-authenticated user terminal is determined from an obtained correspondence between a MAC address of a user terminal and an interface identifier, the determined interface identifier is sent to an access switching node through a control tunnel established between the controller and the access switching node, and the access switching node is instructed to enable an interface corresponding to the interface identifier. In this way, access networks and network access permissions of user terminals can be controlled in a centralized manner, a system architecture is relatively simple and is easy to be implemented, and network security can be further improved.

With reference to the accompanying drawings, the following describes implementation principles, implementation manners, and benefits of the technical solutions in the present disclosure.

The technical solutions provided in the embodiments of the present disclosure may be implemented using a controller. The controller may be disposed on a network as an independent network device, or may be integrated, as an integrated module, into an aggregation switching node disposed on a network, and details are described in the following respectively.

Embodiment 1

Figure 1:
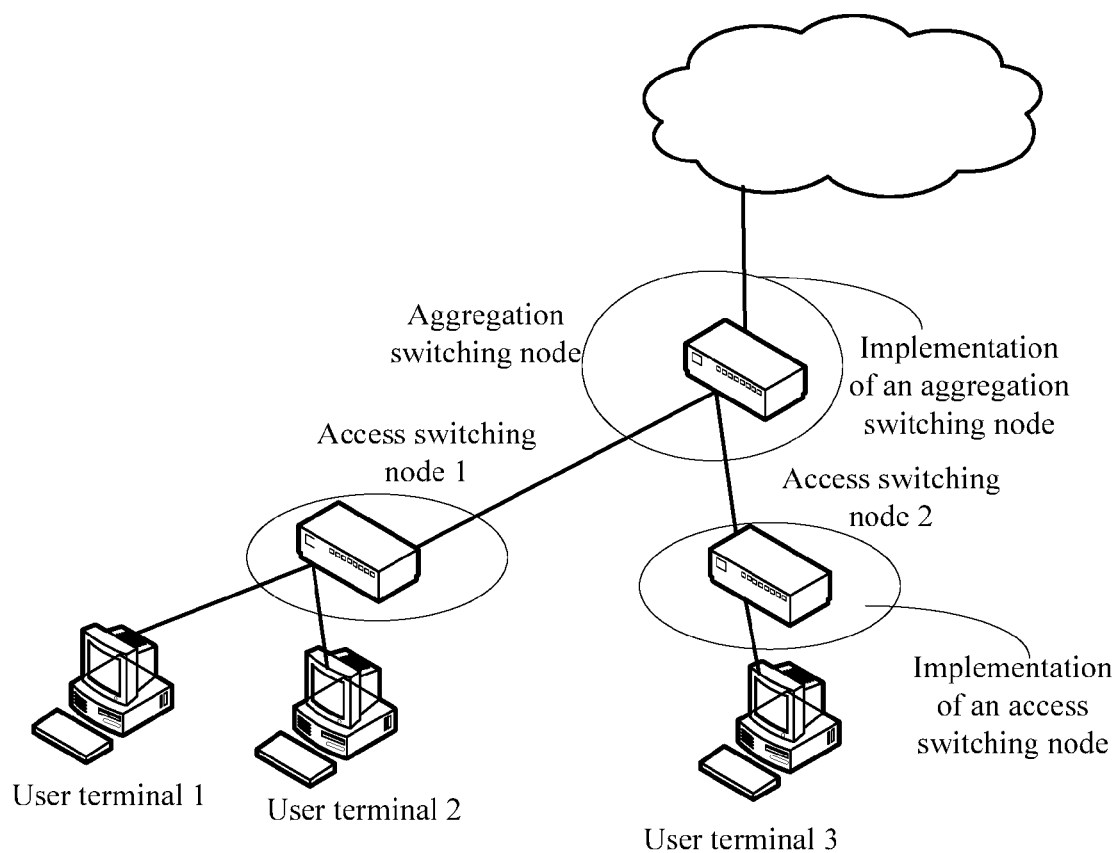
FIG. 1 is a schematic diagram of a network architecture of a system for controlling access of a user terminal.
Figure 2:
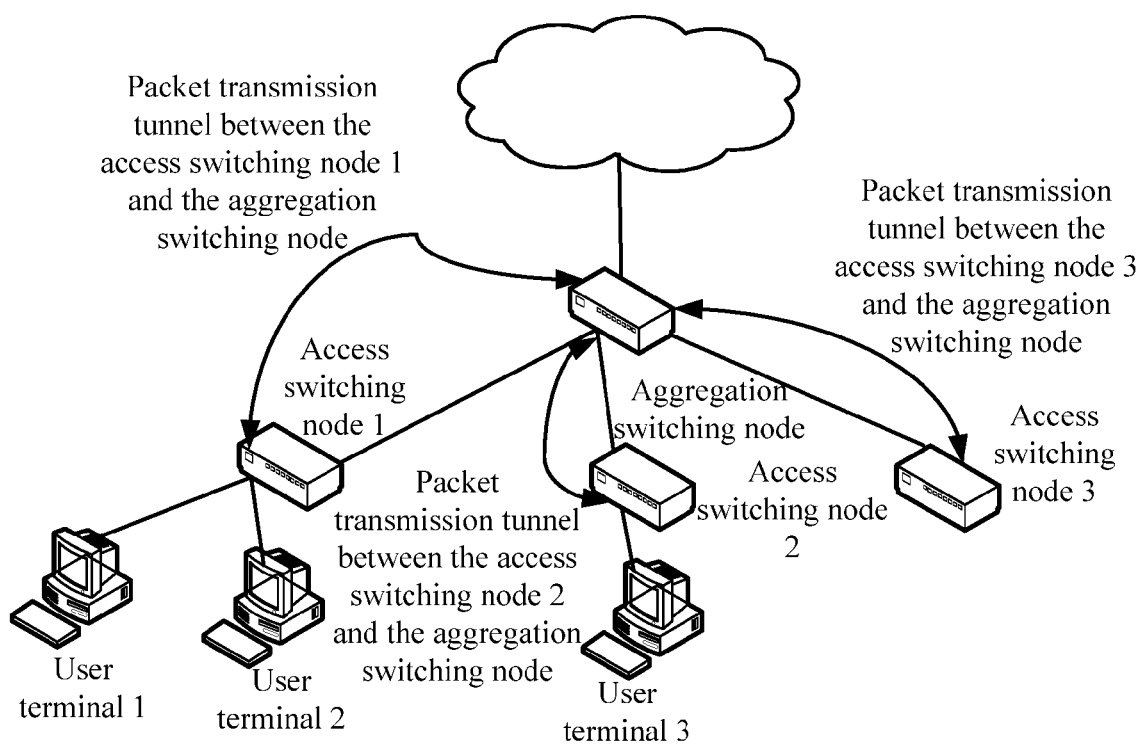
FIG. 2 is a schematic structural diagram of composition of a first system for controlling access of a user terminal according to Embodiment 1 of the present disclosure.

Embodiment 1 of the present disclosure provides a system for controlling access of a user terminal. A controller is integrated into an aggregation switching node as an integrated module, to implement technical solutions provided in Embodiment 1 of the present disclosure. As shown in FIG. 2, the system includes at least one access switching node and at least one aggregation switching node, where each access switching node of the at least one access switching node is connected to one aggregation switching node of the at least one aggregation switching node. Any access switching node of the at least one access switching node may be connected to at least one user terminal in a wired manner, or may not be connected to any user terminal, that is, an interface used to connect to a user terminal is in an idle state.

A packet transmission tunnel is established between an aggregation switching node and an access switching node. The packet transmission tunnel between the aggregation switching node and the access switching node may be established according to a preset proprietary protocol or by extending a standard protocol. For example, the standard protocol may be the CAPWAP protocol. In this embodiment of the present disclosure, that a packet transmission tunnel is established by extending the CAPWAP protocol is used as an example for detailed description. The packet transmission tunnel that is established based on the extended CAPWAP protocol includes a control tunnel for transmitting a control packet and a data tunnel for transmitting a data packet.

Figure 3A:
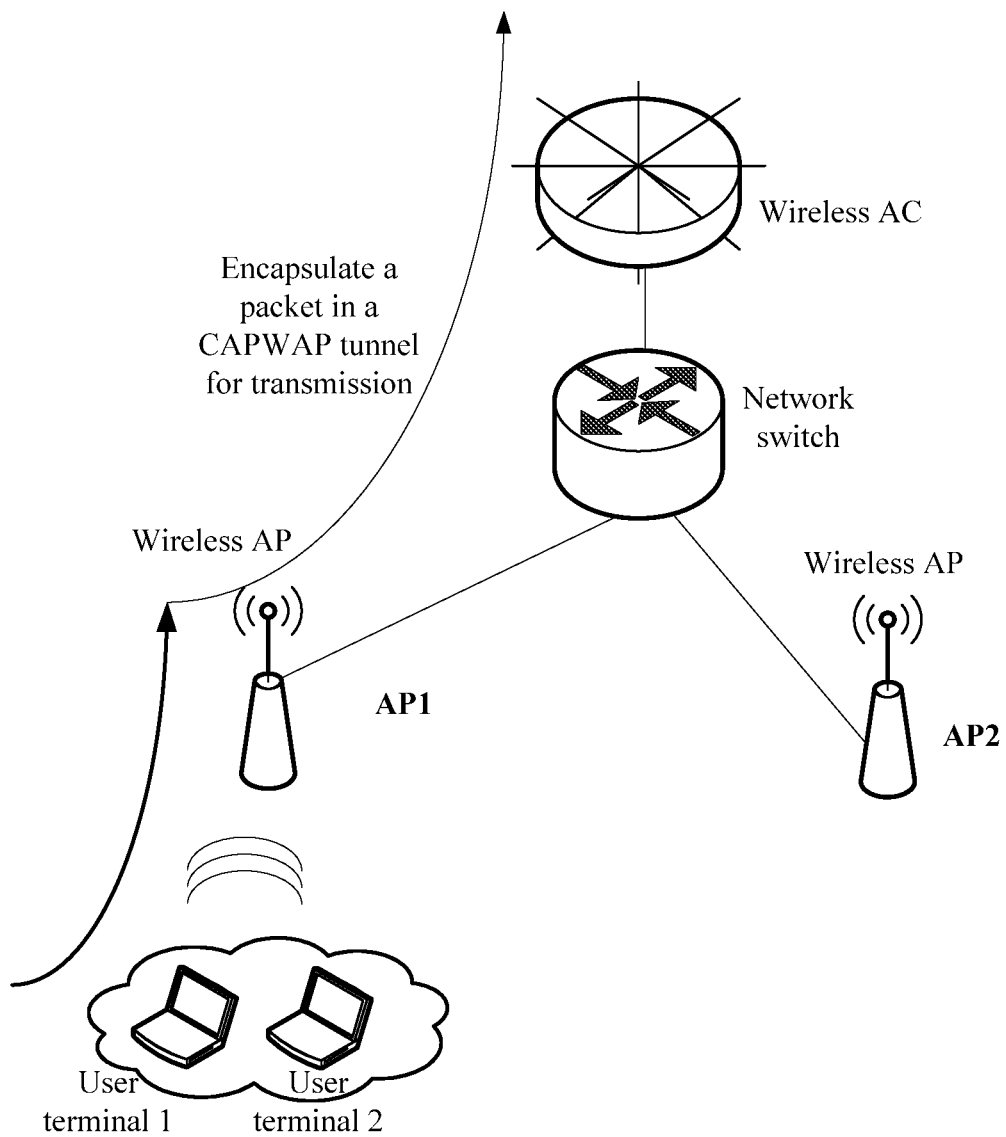
FIG. 3A is a schematic diagram illustrating an application of the Control And Provisioning of Wireless Access Points (CAPWAP) protocol in a wireless local area network (WLAN) system architecture.

The CAPWAP protocol is a standard protocol applied to a wireless communication environment. In the wireless communication environment, the CAPWAP protocol is applied to a scenario of interworking between an access control (AC) node and a wireless access point (AP). As shown in FIG. 3A, the wireless communication environment based on the CAPWAP protocol includes a wireless AP, a network switch, an AC, and a user terminal. The wireless AP is connected to at least one user terminal in a wireless manner. The packet transmission tunnel for transmitting a packet in a wireless manner is established between the wireless AP and the AC based on the CAPWAP protocol. The control tunnel established between the wireless AP and the AC by using the CAPWAP protocol is used to exchange a control packet between the AC and the wireless AP, and the data tunnel established between the wireless AP and the AC by using the CAPWAP protocol is used to carry a data packet sent by a user terminal. The data packet transmitted through the data tunnel and the control packet transmitted through the control tunnel may be transmitted in an unencrypted manner. The Datagram Transport Layer Security (DTLS) protocol may also be used for encryption, to improve security of the data packet transmitted through the data tunnel and that of the control packet transmitted through the control tunnel. In Embodiment 1 of the present disclosure, that the DTLS protocol is used to encrypt the data packet transmitted through the data tunnel and the control packet transmitted through the control tunnel is used as an example, to further describe structural composition of the data packet and that of the control packet.

Figure 3B:
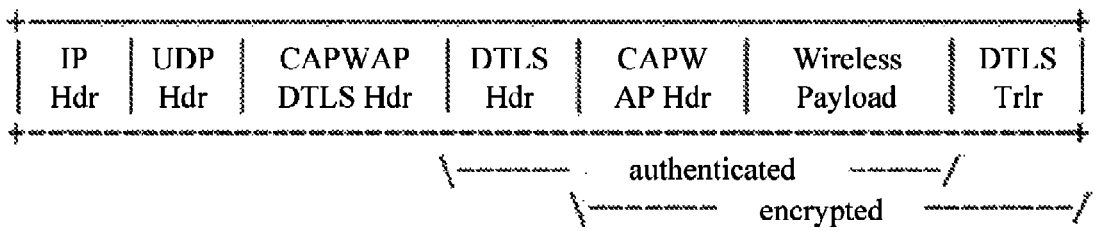
FIG. 3B is a schematic structural diagram of a CAPWAP data packet transmitted through a data tunnel.
Figure 3C:
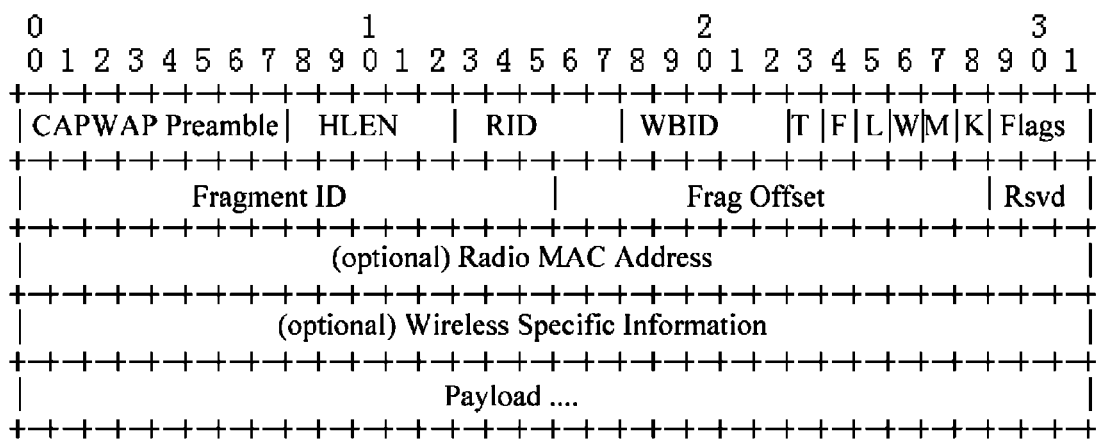
FIG. 3C is a schematic structural diagram of composition of a header of a CAPWAP data packet transmitted through a data tunnel.

The schematic structural diagram of composition of the data packet transmitted through the data tunnel established using the CAPWAP protocol is shown in FIG. 3B. In the structural composition of the data packet transmitted through the data tunnel, the data packet includes an Internet Protocol (IP) address header (IP Hdr shown in the diagram), a User Datagram Protocol (UDP) header (UDP Hdr shown in the diagram), a DTLS header (DTLS Hdr shown in the diagram), a CAPWAP packet header (CAPWAP AP Hdr shown in the diagram), and a wireless payload, where the wireless payload is used to carry data. In structural composition of the CAPWAP Hdr shown in FIG. 3C, the CAPWAP Hdr includes a field identifier, a field offset, an optional wireless MAC address field, or other optional wireless information.

Figure 3D:
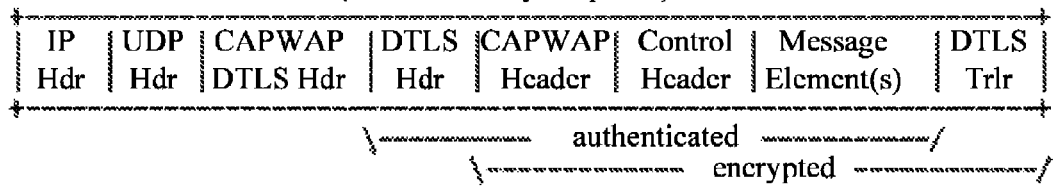
FIG. 3D is a schematic structural diagram of a CAPWAP control packet transmitted through a control tunnel.
Figure 3E:
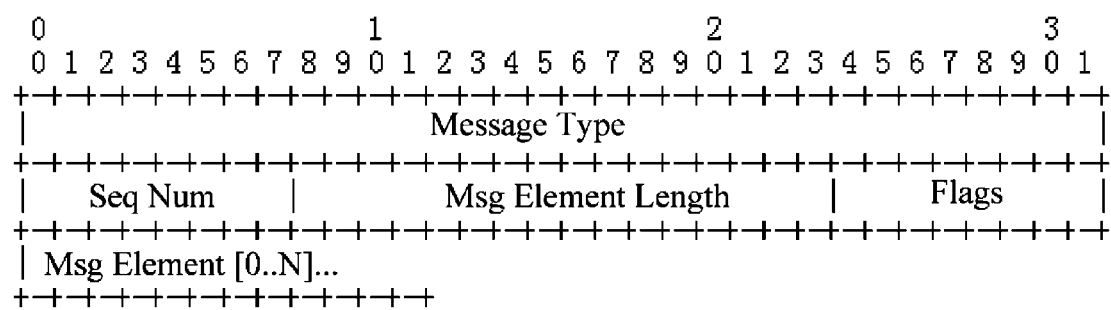
FIG. 3E is a schematic structural diagram of composition of a header of a CAPWAP control packet transmitted through a control tunnel.

FIG. 3D is a schematic structural diagram of composition of a CAPWAP control packet transmitted through the control tunnel. In a structure of the CAPWAP control packet transmitted through the control tunnel, the CAPWAP control packet includes an IP address header (IP Hdr shown in the diagram), a UDP header (UDP Hdr shown in the diagram), a DTLS header (DTLS Hdr shown in the diagram), a CAPWAP packet header (CAPWAP Hdr shown in the diagram), a control header field used to carry a function of the control packet, and a message element field used to carry content of the control packet. The content of the control packet may be called control information. Structural composition of a control header of the CAPWAP control packet is shown in FIG. 3E. The control information carried in the message element field may be type-length-values (TLV) of different types, where T is a type of the control information, L is a length of the control information, and V is a value of the control information. In actual implementation, the value of the control information in the TLV may be extended, that is, in a TLV, multiple extended TLVs may be further included in the value V of the control information, and these extended TLVs may be called level-2 TLVs. In the message element field, if a value of T in the TLV is 37, the TLV is used to perform content extension on the control information. In the technical solutions provided in Embodiment 1 of the present disclosure, a manner of adding a level-2 TLV to the message element in which the value of T is 37 is used to perform content extension on the control message. The message element in which the value of T is 37 may be called a No. 37 message element, where a standard format of the No. 37 message element is shown in Table 1.

TABLE 1

Type of message element: 37, information defined by a device vendor, 2 bytes
Length of message element: 2 bytes
Vendor identifier: values are not the same for different device TABLE 1-continued manufacturers, 4 bytes
Element ID: 2 bytes
Data In Table 1, values of the vendor identifier field are not the same for different device manufacturers. For example, a value 2011 is used as an example for detailed description in the technical solutions provided in this embodiment of the present disclosure, and the example is still used in the following description.

The standard format of the No. 37 message element is extended, and an extended format of the message element is shown in Table 2.

TABLE 2

Type of message element: 37, information defined by a device vendor, 2 bytes
Length of message element: 2 bytes
Vendor identifier: a value of 2011, 4 bytes
Type 1 of level-2 TLV: 2 bytes
Length 1 of level-2 TLV: 2 bytes
Content 1 of level-2 TLV: enlarged
Type 2 of level-2 TLV: 2 bytes
Length 2 of level-2 TLV: 2 bytes
Content 2 of level-2 TLV: enlarged
. . .

That the standard CAPWAP protocol is extended to establish a packet transmission tunnel between an access switching node and an aggregation switching node is used as an example to describe in detail the technical solutions provided in this embodiment of the present disclosure. The packet transmission tunnel that is established based on the extended CAPWAP protocol includes a control tunnel for transmitting control information and a data tunnel for transmitting data information. In a system architecture shown in FIG. 2, the transmission tunnel is established between the aggregation switching node and the access switching node based on the extended CAPWAP protocol. That the access switching node is connected to at least one user terminal is used as an example for detailed description. The access switching node controls data forwarding of all interfaces.

After a user terminal is connected to an interface on the access switching node, the access switching node obtains an interface identifier of the interface connected to the user terminal, obtains a MAC address of the user terminal from a received packet sent by the user terminal, and sends the obtained MAC address of the user terminal and the obtained interface identifier to the aggregation switching node through the established packet transmission tunnel. The interface identifier of the interface on the access switching node may be preset, or may be a combination form of a device identity of the access switching node and a sequence number of the interface. For example, if the device identity of the access switching node is ID, and the access switching node totally includes eight interfaces numbered from 1 to 8, interface identifiers of the eight interfaces on the access switching node may be represented as ID1, ID2, . . . , and ID8. The access switching node may receive a packet sent by the user terminal connected to the interface on the access switching node; determine, using a signal processor of the access switching node, the interface identifier of the interface connected to the user terminal that sends the packet; extract a source MAC address field of the received packet using the signal processor, to obtain the MAC address of the user terminal; and send the obtained MAC address of the user terminal and the obtained interface identifier to the aggregation switching node through the control tunnel that is included in the established packet transmission tunnel.

The signal processor of the access switching node may be a central processing unit (CPU), a combination of a CPU and a hardware chip, a network processor (NP), a combination of a CPU and an NP, or a combination of an NP and a hardware chip.

The aggregation switching node receives the MAC address of the user terminal and the interface identifier of the interface on the access switching node connected to the user terminal, where the MAC address of the user terminal and the interface identifier are sent by the access switching node through the packet transmission tunnel; and maintains a correspondence between the MAC address of the user terminal and the interface identifier according to the received MAC address of the user terminal and the received interface identifier. The correspondence between the MAC address of the user terminal and the interface identifier that is maintained by the aggregation switching node may be stored in a buffering manner. The correspondence is stored within a period of time; after access authentication implemented on the user terminal is complete, the maintained correspondence between the MAC address of the user terminal and the interface identifier may be deleted.

The access switching node has a MAC learning function. MAC learning allows a network switch to learn a MAC address of another device on a network, to identify an interface from which a packet whose destination address is the MAC address is sent. However, when the aggregation switching node implements control on access of the user terminal, if the MAC learning function of the access switching node is not disabled, the user terminal can access, without being authenticated, a network by using the access switching node. In this case, access of the user terminal cannot be controlled. As a result, in a scenario in which the aggregation switching node controls access of the user terminal, the MAC learning function of the access switching node is disabled. If the MAC learning function is disabled, the user terminal cannot directly access a network, and the access switching node cannot find, according to the MAC address of the user terminal, the interface identifier of the interface connected to the user terminal. Therefore, in this embodiment of the present disclosure, the correspondence between the MAC address of the user terminal and the interface identifier is maintained by the aggregation switching node. During a process of implementing control on access of the user terminal, although the access switching node cannot obtain, in a MAC learning manner, the MAC address of the user terminal or the interface identifier of the interface connected to the user terminal, the access switching node can determine, using a signal processor of the access switching node such as a CPU or an NP and in a software manner, the interface identifier of the interface that receives the packet, successfully learn the MAC address of the user terminal from the packet sent by the user terminal, and further implement control on access of the user terminal using the learned MAC address of the user terminal.

The access switching node receives the packet sent by the user terminal that is connected to the interface on the access switching node in a wired manner; encapsulates the packet based on the protocol for establishing the packet transmission tunnel; and then forwards the encapsulated packet to the aggregation switching node based on the established packet transmission tunnel. For example, the access switching node encapsulates, based on the CAPWAP protocol, the received packet sent by the user terminal, and then sends the encapsulated packet to the aggregation switching node.

The aggregation switching node receives the packet that is sent by the user terminal and forwarded by the access switching node, decapsulates the received packet, and implements, according to the decapsulated packet, access authentication on the user terminal that sends the packet. For example, when the aggregation switching node receives the packet that is encapsulated based on the CAPWAP protocol and is transmitted through the packet transmission tunnel established based on the CAPWAP protocol, the aggregation switching node also decapsulates the received packet based on the CAPWAP protocol, and implements, according to the decapsulated packet, authentication on the user terminal that sends the packet. After successfully implementing the access authentication on the user terminal, the aggregation switching node determines, from the maintained correspondence between the MAC address of the user terminal and the interface identifier of the interface on the access switching node connected to the user terminal, the interface identifier corresponding to the MAC address of the successfully-authenticated user terminal, and sends the determined interface identifier to the access switching node.

Optionally, after successfully implementing the access authentication on the user terminal, the aggregation switching node may further determine an access permission of the user terminal, and send the determined access permission of the user terminal to the access switching node together with the determined interface identifier. The access permission may be one or more of the following access permissions: a first access permission, which is a permission of the user terminal for accessing a virtual local area network (VLAN); for example, if a network has multiple VLANs, the permission indicates whether the user terminal can access all the VLANs or VLANs that can be accessed by the user terminal; and a second access permission, which is determining an access control list (ACL) of the user terminal.

The access switching node receives the interface identifier sent by the aggregation switching node, determines, according to the received interface identifier, the interface that is on the access switching node and corresponding to the interface identifier, and implements control on access of the user terminal by controlling the determined interface. For example, the foregoing step may include that the access switching node may enable, according to the interface identifier sent by the aggregation switching node, the interface corresponding to the received interface identifier, and allows the user terminal, which is connected to the interface, to access a network.

Optionally, the access switching node determines, according to the received interface identifier, the interface that is on the access switching node and corresponding to the interface identifier, and implements control on access of the user terminal by controlling the determined interface; or may configure or modify, according to the received access permission sent by the aggregation switching node, an access permission of the interface that is on the access switching node and corresponding to the interface identifier, to control the user terminal, which is connected to the interface, to access a network according to the access permission.

The packet sent by the user terminal may be an Institute of Electrical and Electronics Engineers (IEEE) 802.1x packet, or another type of packet such as an Address Resolution Protocol (ARP) packet or a Dynamic Host Configuration Protocol (DHCP) packet. The following uses an IEEE 802.1x packet as an example to describe in detail the technical solutions provided in Embodiment 1 of the present disclosure.

Access authentication on the user terminal is implemented based on the IEEE 802.1x packet sent by the user terminal.

First, the packet transmission tunnel that includes the control tunnel and the data tunnel is established, based on the extended CAPWAP protocol, between the aggregation switching node and the access switching node.

The packet transmission tunnel that is established, based on the CAPWAP protocol, between the aggregation switching node and the access switching node includes the control tunnel and the data tunnel. The access switching node sends attribute information of the access switching node to the aggregation switching node through the established control tunnel. The attribute information of the access switching node includes an identifier of the access switching node, for example, a MAC address of the access switching node, which may be represented as switch MAC. The attribute information of the access switching node may further include version information of firmware of the access switching node, which may be represented as TYPE_SWITCH_VERSION. The attribute information may be implemented by extending the No. 37 message element among message elements in the CAPWAP control packet. The extended No. 37 message element is sent to the aggregation switching node through the control tunnel. A message element field in the control packet transmitted through the control tunnel is used to carry control information, where the message element may be TLVs of different types. In the message element field, if a value of T in the TLV is 37, the TLV is used to perform content extension on the control information. In the technical solutions provided in Embodiment 1 of the present disclosure, a manner of adding a level-2 TLV to the message element in which the value of T is 37 is used to perform content extension on the control message. The message element in which the value of T is 37 may be called a No. 37 message element, where a standard format of the No. 37 message element is shown in the foregoing Table 1.

Second, after the packet transmission tunnel is established between the aggregation switching node and the access switching node based on the CAPWAP protocol, the aggregation switching node maintains a correspondence between the packet transmission tunnel, which is established based on the CAPWAP protocol, and an identifier of the access switching node such as Switch MAC.

For example, it is assumed that the identifier of the access switching node is Switch 23, after a packet transmission tunnel 1 is established between the aggregation switching node and the access switching node whose identifier is Switch 23, the aggregation switching node may maintain a correspondence between the packet transmission tunnel 1 and Switch 23. In this way, when the access switching node whose identifier is Switch 23 sends a packet to the aggregation switching node through the established packet transmission tunnel subsequently, and when the aggregation switching node processes or responds to the packet, the aggregation switching node may determine, from the maintained correspondence between the packet transmission tunnel 1 and Switch 23, a device that sends the packet through the packet transmission channel, and a packet transmission channel through which response information is transmitted to the access switching node. Content included in the No. 37 message element in the extended CAPWAP control packet of the access switching node may be shown in Table 3.

TABLE 3

Type of message element: 37, 2 bytes
Length of message element: 2 bytes
Vendor identifier: a value of 2011, 4 bytes
Type 1 of level-2 TLV: TYPE_SWITCH_MAC, 2 bytes
Length 1 of level-2 TLV: 0x06, 2 bytes
Content 1 of level-2 TLV: Switch MAC
Length 2 of level-2 TLV: 0x04, 2 bytes
Content 2 of level-2 TLV: Switch version For the packet transmission tunnel that is established based on the CAPWAP protocol, the aggregation switching node sets a manner of authenticating each access switching node to IEEE 802.1x-based authentication. Exemplarily, the aggregation switching node may further set a manner of authenticating an interface on each access switching node to IEEE 802.1x-based authentication.

When a connection is established between the user terminal and the interface on the access switching node, the access switching node receives the 802.1x packet sent by the user terminal, obtains the interface identifier of the interface connected to the user terminal that sends the 802.1x packet, and obtains the MAC address of the user terminal from the received 802.1x packet sent by the user terminal. The access switching node sends the obtained MAC address of the user terminal and the obtained interface identifier to the aggregation switching node through the packet transmission tunnel established based on the CAPWAP protocol. The packet transmission tunnel that is established based on the CAPWAP protocol includes the control tunnel and the data tunnel, where the control tunnel may be used to transmit the CAPWAP control packet, and the data tunnel may be used to transmit the CAPWAP data packet. Therefore, the access switching node may send the obtained MAC address of the user terminal and the obtained interface identifier to the aggregation switching node through the control tunnel.

More specifically, the access switching node may send, based on an extended level-2 TLV, the obtained MAC address of the user terminal and the obtained interface identifier to the aggregation switching node, where the extended level-2 TLV is shown in Table 4. USER_MAC shown in Table 4 is the MAC address of the user terminal, and interface index is the interface identifier.

TABLE 4

Type of message element: 37, 2 bytes
Length of message element: 2 bytes
Vendor identifier: a value of 2011, 4 bytes
Type 1 of level-2 TLV: TYPE_USER_MAC, 2 bytes
Length 1 of level-2 TLV: 0x06, 2 bytes
Content 1 of level-2 TLV: USER MAC
Type 2 of level-2 TLV: TYPE_USER_SWITCH_IF, 2 bytes
Length 2 of level-2 TLV: 0x04, 2 bytes
Content 2 of level-2 TLV: interface index The access switching node captures, on the interface of the access switching node, the IEEE 802.1x packet sent by the user terminal, sends the captured IEEE 802.1x packet to the aggregation switching node through the packet transmission channel established based on the CAPWAP protocol. The packet transmission tunnel that is established based on the CAPWAP protocol includes the control tunnel and the data tunnel, where the control tunnel may be used to transmit the CAPWAP control packet, and the data tunnel may be used to transmit the CAPWAP data packet. After encapsulating the captured IEEE 802.1x packet based on the CAPWAP protocol, the access switching node may send the encapsulated IEEE 802.1x packet to the aggregation switching node through the data tunnel.

The aggregation switching node receives the MAC address of the user terminal and the interface identifier, and maintains the correspondence between the MAC address of the user terminal and the interface identifier.

In the technical solutions provided in Embodiment 1 of the present disclosure, that a MAC address of the user terminal, and an interface identifier that is a MAC address and an interface number of the access switching node, are used as an example for detailed description. A user terminal 1 and an access switching node 1 shown in FIG. 2 are used as an example for detailed description. It is assumed that an identifier of the user terminal 1 is user equipment (UE) MAC1, an identifier of the access switching node 1 is AP MAC1, and the access switching node 1 provides a total of eight access interfaces numbered from 1 to 8. If the user terminal 1 is connected to the second interface, the interface identifier of the interface is AP MAC1-2. When the user terminal 1 is connected to the access switching node 1, the user terminal 1 sends a packet, and the access switching node obtains the interface identifier AP MAC1-2 of the interface connected to the user terminal 1. The access switching node 1 captures the packet sent by the user terminal 1, uses a signal processor of the access switching node 1 to analyze the captured packet, to obtain the identifier UE MAC1 of the user terminal 1 in the packet, and sends the obtained UE MAC1 and AP MAC1-2 to the aggregation switching node through the control tunnel by extending the No. 37 message element in the CAPWAP control packet. For example, that the identifier of the terminal and the interface identifier that are received by the aggregation switching node are respectively UE MAC1 and AP MAC1-2 is used as an example for detained description. The aggregation switching node receives UE MAC1 and AP MAC1-2 that are sent by the access switching node, and establishes and buffers a correspondence between UE MAC1 and AP MAC1-2.

The access switching node receives the IEEE 802.1x packet sent by the user terminal, encapsulates the received IEEE 802.1x packet based on the CAPWAP protocol, and then sends the encapsulated packet to the aggregation switching node through the data tunnel.

The aggregation switching node receives the IEEE 802.1x packet encapsulated based on the CAPWAP protocol, decapsulates the received IEEE 802.1x packet that is encapsulated based on the CAPWAP protocol, and implements access authentication according to the decapsulated IEEE 802.1x packet.

Optionally, the aggregation switching node may further limit permission information of the user terminal. After authentication succeeds, the aggregation switching node determines the access permission of the user terminal.

The aggregation switching node determines, from the maintained correspondence between the MAC address of the user terminal and the interface identifier of the interface on the access switching node connected to the user terminal, an interface identifier corresponding to the MAC address of the successfully-authenticated user terminal, and sends the determined interface identifier to the access switching node.

Optionally, the aggregation switching node may further send the determined access permission of the user terminal to the access switching node together with the determined interface identifier.

Information such as the MAC address of the user terminal, the interface identifier, and the access permission of the user terminal may be sent by the aggregation switching node to the access switching node using the extended level-2 TLV. The extended level-2 TLV may be shown in Table 5. For a Content 3 of level-2 TLV field in Table 5, USER VLAN is used to indicate a VLAN that can be accessed by the user terminal; for a Content 4 of level-2 TLV field, a rule field is used to indicate the access permission of the user terminal.

TABLE 5

Type of message element: 37, 2 bytes
Length of message element: 2 bytes
Vendor identifier: a value of 2011, 4 bytes
Type 1 of level-2 TLV: TYPE_USER_MAC, 2 bytes
Length 1 of level-2 TLV: 0x06, 2 bytes
Content 1 of level-2 TLV: USER MAC
Type 2 of level-2 TLV: TYPE_USER_SWITCH_IF, 2 bytes
Length 2 of level-2 TLV: 0x04, 2 bytes
Content 2 of level-2 TLV: interface index
Type 3 of level-2 TLV: TYPE_USER_VLAN, 2 bytes
Length 3 of level-2 TLV: 0x02, 2 bytes
Content 3 of level-2 TLV: USER VLAN
Type 4 of level-2 TLV: TYPE_USER_ACL, 2 bytes
Length 4 of level-2 TLV: enlarged, 2 bytes
Content 4 of level-2 TLV: rule information
. . .

The access switching node determines a corresponding interface on the access switching node according to the interface identifier carried in an authentication success message, enables the interface, and allows the user terminal to access a network.

Optionally, the access switching node may further control, according to the received access permission delivered by the aggregation switching node, the interface corresponding to the interface identifier, to implement control on the access permission of the user terminal.

Figure 4:
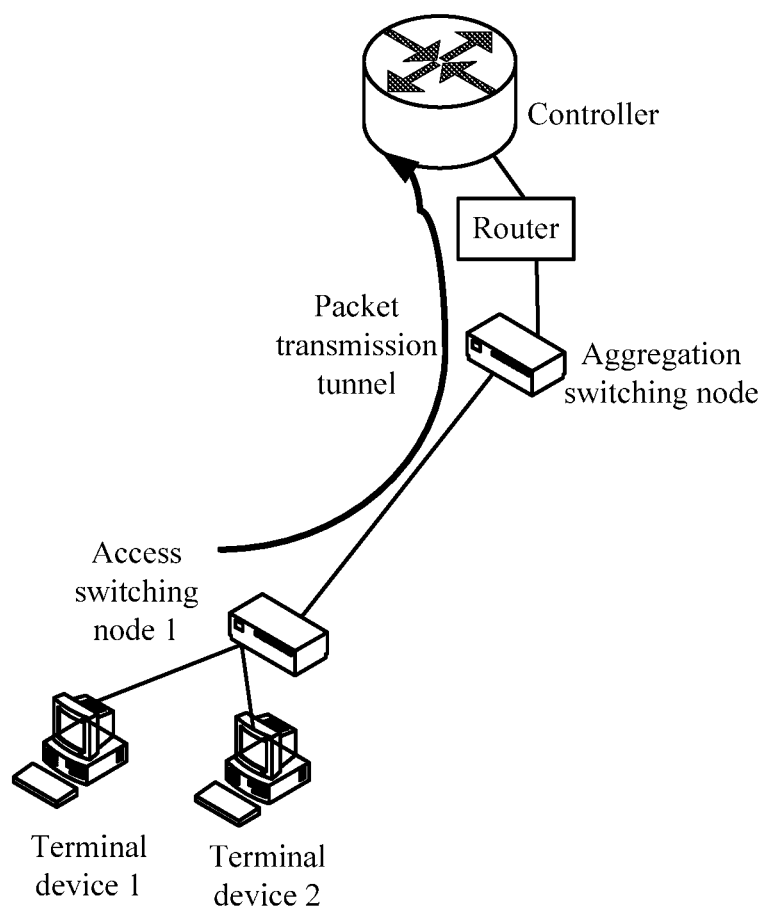
FIG. 4 is a schematic structural diagram of composition of a second system for controlling access of a user terminal according to Embodiment 1 of the present disclosure.

In the foregoing technical solutions provided in this embodiment of the present disclosure, the aggregation switching node that has a packet forwarding function is used as an example for detailed description. In implementation, the controller disposed independently in the system may be further used to implement the technical solutions to control access of the user terminal. A system architecture shown in FIG. 4 includes at least one controller that is disposed independently, at least one access switching node, and at least one packet forwarding device. The packet forwarding device may be an aggregation switching node. The controller may be directly connected to the aggregation switching node, or may be connected to the aggregation switching node using a router that is disposed. Each access switching node of the at least one access switching node is connected to one aggregation switching node of the at least one aggregation switching node. Any access switching node of the at least one access switching node may be connected to at least one user terminal in a wired manner, or may not be connected to any user terminal, that is, an interface used to connect to a user terminal is in an idle state.

A packet transmission tunnel is established between the controller and the access switching node. The packet transmission tunnel between the controller and the access switching node may be established according to a preset proprietary protocol or by extending a standard protocol. The standard protocol may be the CAPWAP protocol. In this embodiment of the present disclosure, that a packet transmission tunnel is established by extending the CAPWAP protocol is used as an example for detailed description. The packet transmission tunnel that is established based on the extended CAPWAP protocol includes a control tunnel for transmitting control information and a data tunnel for transmitting data information.

After the packet transmission tunnel is established based on the CAPWAP protocol, when a user terminal is connected to an interface on the access switching node and sends a packet, the access switching node obtains an interface identifier of the interface that receives the packet, that is, an interface identifier of the interface connected to the user terminal that sends the packet; obtains a MAC address of the user terminal from the received packet; and sends the obtained MAC address of the user terminal and the obtained interface identifier to the controller through the established packet transmission tunnel. The interface identifier of the interface on the access switching node may be preset, or may be a combination form of a device identity of the access switching node and a sequence number of the interface.

The access switching node may receive a packet sent by the user terminal connected to the interface on the access switching node; determine, using a signal processor of the access switching node, the interface identifier of the interface connected to the user terminal that sends the packet; extract a source MAC address field of the received packet using the signal processor, to obtain the MAC address of the user terminal; and send the obtained MAC address of the user terminal and the obtained interface identifier to the controller through the control tunnel that is included in the established packet transmission tunnel.

The signal processor of the access switching node may be a CPU, a combination of a CPU and a hardware chip, an NP, a combination of a CPU and an NP, or a combination of an NP and a hardware chip.

The controller receives the MAC address of the user terminal and the interface identifier of the interface on the access switching node connected to the user terminal, where the MAC address of the user terminal and the interface identifier are sent by the access switching node through the packet transmission tunnel; and maintains a correspondence between the MAC address of the user terminal and the interface identifier according to the received MAC address of the user terminal and the received interface identifier. The correspondence between the MAC address of the user terminal and the interface identifier that is maintained by the controller may be stored in a buffering manner. The correspondence is stored within a period of time; after access authentication implemented on the user terminal is complete, the maintained correspondence between the MAC address of the user terminal and the interface identifier may be deleted.

The access switching node receives the packet sent by the user terminal that is connected to the interface on the access switching node in a wired manner; encapsulates the packet based on the protocol that is used to establish the packet transmission tunnel; and then forwards the encapsulated packet to the controller through the established packet transmission tunnel. The access switching node encapsulates, based on the CAPWAP protocol, the received packet that is sent by the user terminal, and then sends the encapsulated packet to the controller.

The controller receives the packet that is sent by the user terminal and forwarded by the access switching node, decapsulates the received packet, and implements, according to the decapsulated packet, access authentication on the user terminal that sends the packet. For example, when the controller receives the packet that is encapsulated based on the CAPWAP protocol and is transmitted through the packet transmission tunnel established based on the CAPWAP protocol, the controller also decapsulates the received packet based on the CAPWAP protocol, and implements, according to the decapsulated packet, authentication on the user terminal that sends the packet. After successfully implementing the access authentication on the user terminal, the controller determines, from the maintained correspondence between the MAC address of the user terminal and the interface identifier of the interface on the access switching node connected to the user terminal, the interface identifier corresponding to the MAC address of the successfully-authenticated user terminal, and sends the determined interface identifier to the access switching node.

Optionally, after successfully implementing the access authentication on the user terminal, the controller may further determine an access permission of the user terminal, and send the determined access permission of the user terminal to the access switching node together with the determined interface identifier. The access permission may be one or more of the following access permissions: a first access permission, which is a permission of the user terminal for accessing a VLAN; for example, if a network has multiple VLANs, the permission indicates whether the user terminal can access all the VLANs or VLANs that can be accessed by the user terminal; and a second access permission, which is determining an ACL of the user terminal.

When receiving the interface identifier sent by the controller, the access switching node determines, according to the received interface identifier, the interface that is on the access switching node and corresponding to the interface identifier, and implements control on access of the user terminal by controlling the determined interface.

For example, the foregoing step may include that the access switching node may enable, according to the interface identifier sent by the controller, the interface corresponding to the received interface identifier, and allows the user terminal, which is connected to the interface, to access a network.

Optionally, the access switching node may further determine, according to the received interface identifier, the interface that is on the access switching node and corresponding to the interface identifier, and implement control on access of the user terminal by controlling the determined interface; or may configure or modify, according to the received access permission sent by the controller, an access permission of the interface that is on the access switching node and corresponding to the interface identifier, to control the user terminal, which is connected to the interface, to access a network according to the access permission.

The packet sent by the user terminal may be an IEEE 802.1x packet, or another type of packet such as an ARP packet or a DHCP packet.

Embodiment 2

Figure 5:
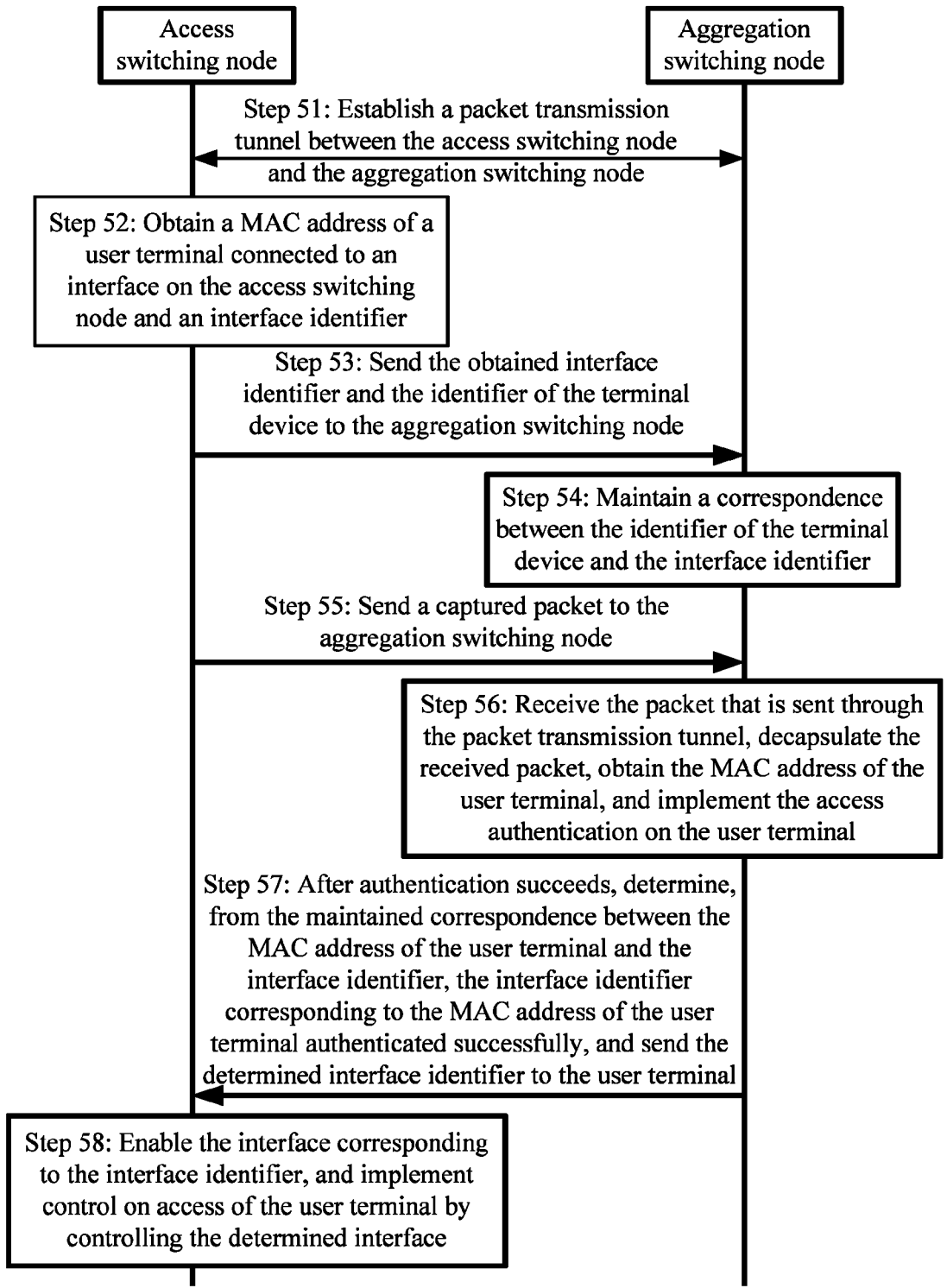
FIG. 5 is a flowchart of a method for controlling access of a user terminal according to Embodiment 2 of the present disclosure.

Based on the system architecture shown in FIG. 2, Embodiment 2 of the present disclosure provides a method for controlling access of a user terminal. As shown in FIG. 5, a processing procedure of the method is as follows.

Step 51: Establish a packet transmission tunnel between an access switching node and an aggregation switching node.

The packet transmission tunnel between the aggregation switching node and the access switching node may be established according to a preset proprietary protocol or by extending a standard protocol. For example, the standard protocol may be the CAPWAP protocol. In Embodiment 2 of the present disclosure, that a packet transmission tunnel is established by extending the CAPWAP protocol is used as an example for detailed description. The packet transmission tunnel that is established based on the extended CAPWAP protocol includes a control tunnel for transmitting control information and a data tunnel for transmitting data information.

Step 52: The access switching node obtains a MAC address of a user terminal connected to an interface on the access switching node and an interface identifier of the interface connected to the user terminal.

The user terminal is connected to the interface on the access switching node in a wired manner, and sends a packet.

When the user terminal is connected to the interface on the access switching node and sends a packet, the access switching node obtains the interface identifier of the interface connected to the user terminal, captures the packet sent by the user terminal, obtains the MAC address of the user terminal from the captured packet, and sends the obtained MAC address of the user terminal and the obtained interface identifier to the aggregation switching node through the established packet transmission tunnel. The interface identifier of the interface on the access switching node may be preset, or may be a combination form of a device identity of the access switching node and a sequence number of the interface. The access switching node may receive a packet sent by the user terminal connected to the interface on the access switching node; determine, using a signal processor of the access switching node, the interface identifier of the interface connected to the user terminal that sends the packet; extract a source MAC address field of the received packet using the signal processor, to obtain the MAC address of the user terminal; and send the obtained MAC address of the user terminal and the obtained interface identifier to the aggregation switching node through the control tunnel that is included in the established packet transmission tunnel.

The signal processor of the access switching node may be a CPU, a combination of a CPU and a hardware chip, an NP, a combination of a CPU and an NP, or a combination of an NP and a hardware chip.

The packet that is sent by the user terminal and captured by the access switching node may include an IEEE 802.1x packet, an ARP packet, or a DHCP packet.

Step 53: The access switching node sends the obtained interface identifier and the obtained MAC address of the user terminal to the aggregation switching node through the established packet transmission tunnel.

The packet transmission tunnel that is established based on the CAPWAP protocol includes the control tunnel and the data tunnel, where the control tunnel may be used to transmit a control packet, and the data tunnel may be used to transmit a data packet. Therefore, the access switching node may send the obtained MAC address of the user terminal and the obtained interface identifier to the aggregation switching node through the control tunnel. The access switching node may send, based on an extended level-2 TLV, the obtained MAC address of the user terminal and the obtained interface identifier to the aggregation switching node. The extended level-2 TLV is described in the foregoing Table 4.

Step 54: The aggregation switching node receives the MAC address of the user terminal and the interface identifier that are sent by the access switching node, and maintains a correspondence between the MAC address of the user terminal and the interface identifier.

The correspondence between the MAC address of the user terminal and the interface identifier that is maintained by the aggregation switching node may be stored in a buffering manner. The correspondence is stored within a period of time; after access authentication implemented on the user terminal is complete, the maintained correspondence between the MAC address of the user terminal and the interface identifier may be deleted.

Step 55: The access switching node captures, on the interface of the access switching node, a packet sent by the user terminal, and sends the captured packet to the aggregation switching node through the packet transmission channel established based on the CAPWAP protocol.

The packet transmission tunnel that is established based on the CAPWAP protocol includes the control tunnel and the data tunnel, where the control tunnel may be used to transmit a control packet, and the data tunnel may be used to transmit a data packet. The access switching node may encapsulate the captured packet based on the CAPWAP protocol, and then send the encapsulated packet to the aggregation switching node through the data tunnel.

Step 56: The aggregation switching node receives the packet that is sent through the packet transmission tunnel, decapsulates the received packet, obtains the MAC address of the user terminal, and implements access authentication on the user terminal.

The aggregation switching node receives the packet encapsulated based on the CAPWAP protocol, decapsulates the received packet that is encapsulated based on the CAPWAP protocol, and implements access authentication according to the decapsulated packet.

A manner of implementing access authentication on the user terminal is the same as that of common access authentication, and details are not described in this embodiment of the present disclosure again.

Step 57: After authentication succeeds, the aggregation switching node determines, from the maintained correspondence between the MAC address of the user terminal and the interface identifier of the interface on the access switching node connected to the user terminal, the interface identifier corresponding to the MAC address of the successfully-authenticated user terminal, and sends the determined interface identifier to the access switching node.

Optionally, after successfully implementing the access authentication on the user terminal, the aggregation switching node may further determine an access permission of the user terminal, and send the determined access permission of the user terminal to the access switching node together with the determined interface identifier.

An authentication success message sent by the aggregation switching node to the access switching node may include information such as the MAC address of the user terminal, the interface identifier, and the access permission of the user terminal, and the information may be sent to the access switching node using the extended level-2 TLV. The extended level-2 TLV may be described in the foregoing Table 5.

Step 58: The access switching node receives the interface identifier sent by the aggregation switching node, enables the interface corresponding to the interface identifier, and implements control on access of the user terminal by controlling the determined interface.

For example, the access switching node may enable, according to the interface identifier sent by the aggregation switching node, the interface corresponding to the received interface identifier, and allow the user terminal, which is connected to the interface, to access a network for packet transmission.

Optionally, the access switching node may further receive the access permission that is corresponding to the user terminal and is sent by the aggregation switching node; and control, by controlling the interface connected to the user terminal, the user terminal to access a network according to the received access permission.

The packet sent by the user terminal may be an IEEE 802.1x packet, or another type of packet such as an ARP packet or a DHCP packet.

The flowchart of the method for controlling access of a user terminal shown in FIG. 5 and the foregoing method for controlling access of a user terminal provided in Embodiment 2 of the present disclosure are merely preferable implementation manners described in this embodiment of the present disclosure. In implementation, alternative processing may be performed according to the foregoing method procedure.

Embodiment 3

Figure 6A:
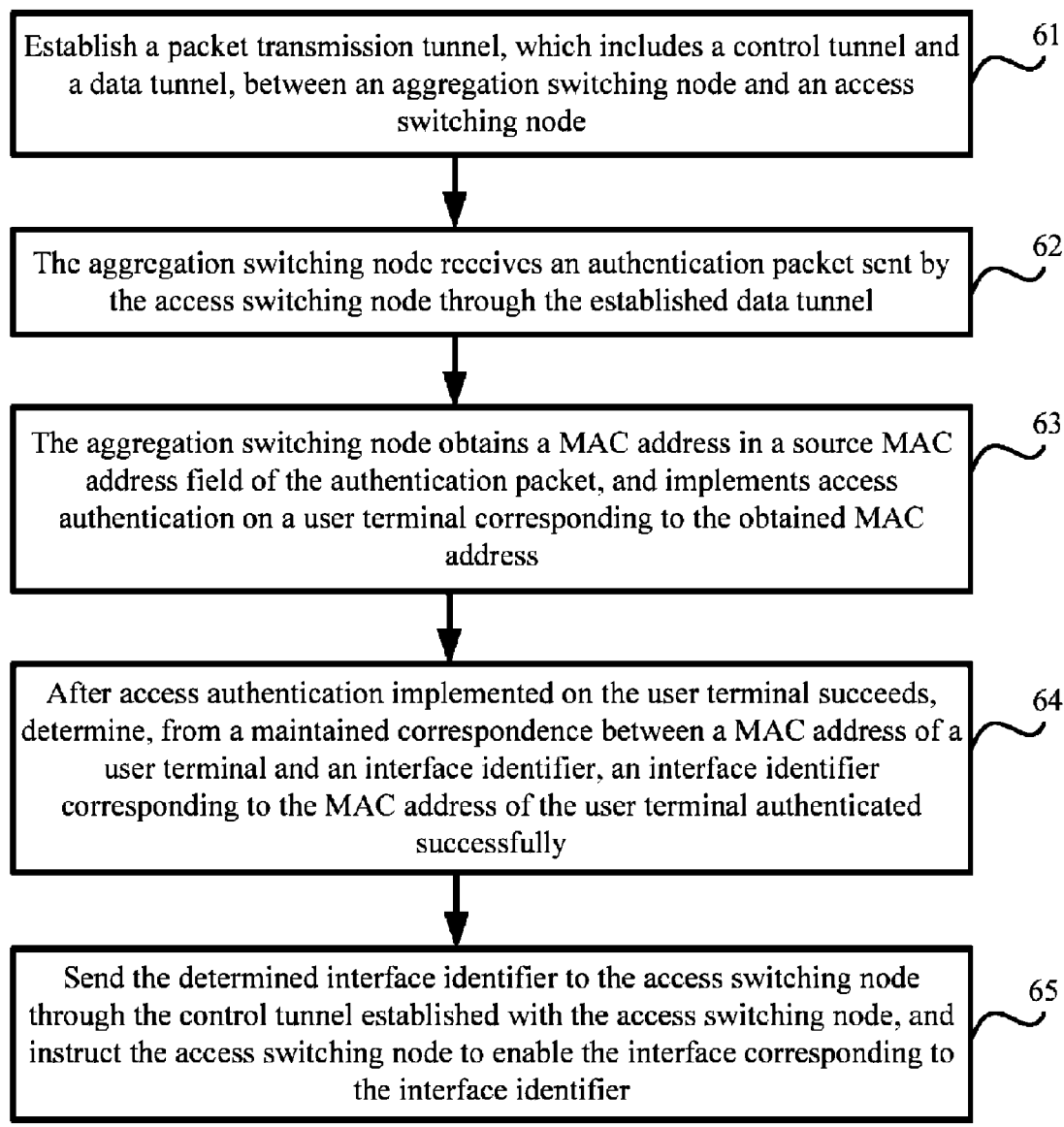
FIG. 6A is a flowchart of a method for controlling access of a user terminal according to Embodiment 3 of the present disclosure, where the method is applied to an aggregation switching node side.

Correspondingly, based on the system architecture shown in FIG. 2 and for an aggregation switching node, an embodiment of the present disclosure provides a method for controlling access of a user terminal. As shown in FIG. 6A, a processing procedure of the method is as follows.

Step 61: Establish, between the aggregation switching node and an access switching node, a packet transmission tunnel that includes a control tunnel and a data tunnel.

The aggregation switching node may establish the packet transmission tunnel with the access switching node based on a proprietary protocol or based on extension of a standard protocol. In Embodiment 3 of the present disclosure, the packet transmission tunnel is established between the controller and the access switching node based on extension of the CAPWAP protocol.

For a process of establishing the packet transmission tunnel based on the CAPWAP protocol, refer to the detailed description in Embodiment 1, and details are not described in Embodiment 3 of the present disclosure again.

During a process of establishing the packet transmission tunnel between the aggregation switching node and the access switching node based on the CAPWAP protocol, the aggregation switching node maintains a correspondence between the established packet transmission tunnel and the access switching node. For example, it is assumed that the identifier of the access switching node is Switch 23, after a packet transmission tunnel 1 is established between the aggregation switching node and the access switching node whose identifier is Switch 23, the aggregation switching node may maintain a correspondence between the packet transmission tunnel 1 and Switch 23. In this way, when the access switching node whose identifier is Switch 23 sends a packet to the aggregation switching node through the established packet transmission tunnel subsequently, and when the aggregation switching node processes or responds to the packet, the aggregation switching node may determine, from the maintained correspondence between the packet transmission tunnel 1 and Switch 23, a device that sends the packet, a packet transmission channel through which the packet is sent, an access switching node to which the packet shall be transmitted, and a packet transmission channel through which response information shall be transmitted.

Step 62: The aggregation switching node receives an authentication packet sent by the access switching node through the established data tunnel.

The packet sent by the access switching node is a packet that is sent by the user terminal connected to an interface on the access switching node and is captured on the interface by the access switching node. The captured packet is sent to the aggregation switching node after being encapsulated based on the CAPWAP protocol. The packet captured by the access switching node may be an 802.1x packet, an ARP packet, or a DHCP packet.

Step 63: The aggregation switching node obtains a MAC address in a source MAC address field of the authentication packet, and implements access authentication on a user terminal corresponding to the obtained MAC address.

Step 64: After the access authentication implemented on the user terminal succeeds, determine, from a maintained correspondence between a MAC address of a user terminal and an interface identifier, an interface identifier corresponding to the MAC address of the successfully-authenticated user terminal.

A correspondence between a MAC address of a user terminal and an interface identifier of the access switching node connected to the user terminal may be determined in the following manner: receiving the MAC address of the user terminal that is sent by the access switching node through the control tunnel, and the interface identifier of the interface on the access switching node connected to the user terminal, where the MAC address of the user terminal and the interface identifier of the interface on the access switching node connected to the user terminal are obtained by the access switching node when the user terminal establishes a connection with the interface on the access switching node, and sends a packet through the connected interface; and establishing a correspondence between the MAC address of the user terminal and the interface identifier according to the received MAC address of the user terminal and the received interface identifier.

The correspondence between the MAC address of the user terminal and the interface identifier that is maintained by the aggregation switching node may be stored in a buffering manner. The correspondence is stored within a period of time; after the access authentication implemented on the user terminal is complete, the correspondence between the MAC address of the user terminal and the interface identifier may be deleted.

For establishment of the correspondence between a MAC address of a user terminal and an interface identifier, refer to the detailed description in Embodiment 1 and Embodiment 2, and details are not described in Embodiment 3 of the present disclosure again.

Step 65: Send the determined interface identifier to the access switching node through the control tunnel established between the controller and the access switching node, and instruct the access switching node to enable the interface corresponding to the interface identifier.

Optionally, the access authentication implemented on the user terminal may further include determining an access permission of the user terminal. The aggregation switching node sends the determined access permission of the user terminal to the access switching node through the control tunnel, to instruct the access switching node to control, according to the access permission, the user terminal to access a network.

Figure 6B:
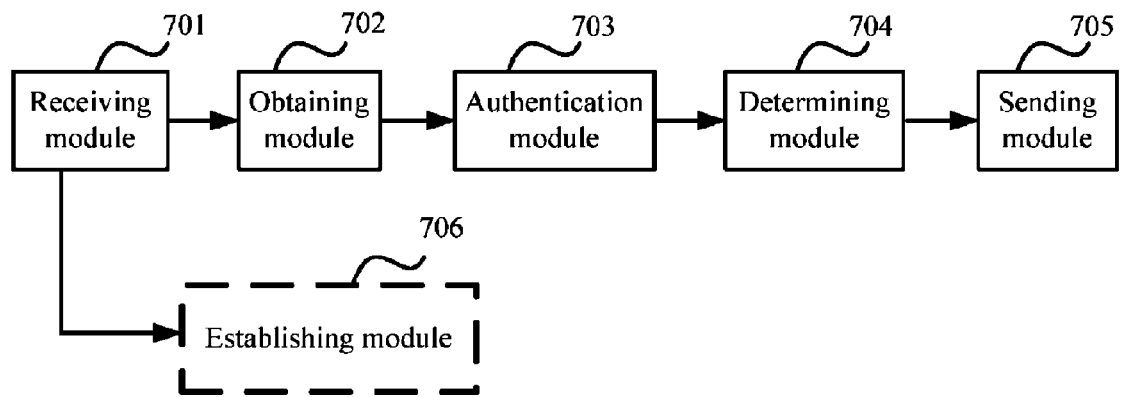
FIG. 6B is a schematic structural diagram of composition of an apparatus for controlling access of a user terminal according to Embodiment 3 of the present disclosure.

Correspondingly, Embodiment 3 of the present disclosure further provides an apparatus for controlling access of a user terminal. As shown in FIG. 6B, the apparatus includes a receiving module 701 configured to receive an authentication packet sent through an established data tunnel, and transmit the received authentication packet to an obtaining module 702; the obtaining module 702 configured to obtain the authentication packet transmitted by the receiving module 701, obtain a MAC address in a source MAC address field of the authentication packet, and transmit the obtained MAC address to an authentication module 703; the authentication module 703 configured to receive the MAC address transmitted by the obtaining module 702, implement access authentication on a user terminal corresponding to the MAC address, and transmit a result of authentication success to a determining module 704; the determining module 704 configured to obtain the result of authentication success transmitted by the authentication module 703; determine, from a maintained correspondence between a MAC address of a user terminal and an interface identifier, an interface identifier corresponding to the MAC address of the successfully-authenticated user terminal, where the interface identifier is an interface identifier of an interface on an access switching node connected to the user terminal; and transmit the interface identifier to a sending module 705; and the sending module 705 configured to obtain the interface identifier transmitted by the determining module 704, send the determined interface identifier to the access switching node through a control tunnel established between the controller and the access switching node, and instruct the access switching node to enable the interface corresponding to the interface identifier.

The foregoing receiving module 701 is further configured to receive the MAC address of the user terminal sent by the access switching node through the control tunnel, and the interface identifier of the interface on the access switching node connected to the user terminal, where the MAC address of the user terminal and the interface identifier of the interface on the access switching node connected to the user terminal are obtained by the access switching node when the user terminal establishes a connection with the interface on the access switching node, and sends a packet through the connected interface; and transmit the received MAC address and the received interface identifier to an establishing module 706.

The apparatus further includes the establishing module 706 configured to obtain the MAC address and the interface identifier that are transmitted by the receiving module 705, and establish a correspondence between the MAC address of the user terminal and the interface identifier according to the received MAC address of the user terminal and the received interface identifier.

Figure 6C:
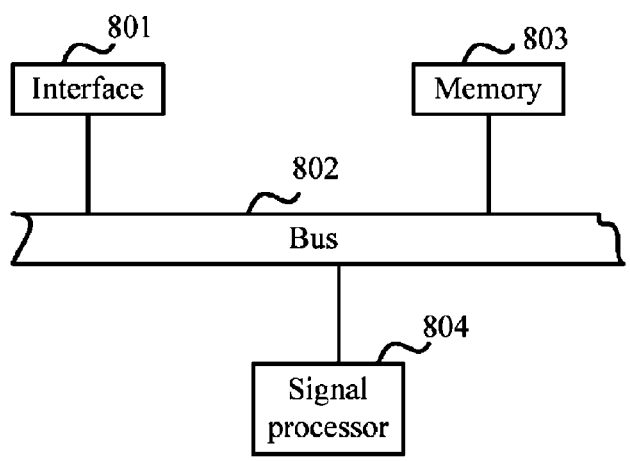
FIG. 6C is a schematic structural diagram of a network switch according to Embodiment 3 of the present disclosure.

Correspondingly, Embodiment 3 of the present disclosure further provides a network switch. As shown in FIG. 6C, the network switch includes an interface 801, a memory 803, and a signal processor 804.

The interface 801 is configured to receive an authentication packet sent through an established data tunnel, and transmit the received authentication packet to the signal processor 804 through a bus 802.

The interface 801 may be one or more of the following: a network interface controller (NIC) that provides a wired interface, for example, an Ethernet NIC that may provide a copper wire interface and/or a fiber interface; a NIC that provides a wireless interface, for example, a WLAN NIC.

The memory 803 is configured to store program code, and store a correspondence between a MAC address of a user terminal and an interface identifier, and transmit the stored program code to the signal processor 804 through the bus 802.

The memory 803 may be a volatile memory, for example, a random-access memory (RAM); or a non-volatile memory, for example, a flash memory, a hard disk drive (HDD) or a solid-state drive (SSD); or a combination of memories of the foregoing types.

The signal processor 804 is configured to obtain, using the bus 802, the program code stored in the memory 803, and execute the following according to the obtained program code: obtaining the MAC address in a source MAC address field of the authentication packet; implementing access authentication on the user terminal corresponding to the MAC address; after the access authentication succeeds, obtaining the correspondence between the MAC address of the user terminal and the interface identifier that is stored in the memory 803; determining, from the obtained correspondence between the MAC address of the user terminal and the interface identifier, an interface identifier corresponding to the MAC address of the successfully-authenticated user terminal, where the interface identifier is an interface identifier of the interface on an access switching node connected to the user terminal; and transmitting the interface identifier to the interface 801 through the bus 802.

The signal processor 804 may be a CPU, a combination of a CPU and a hardware chip, an NP, a combination of a CPU and an NP, or a combination of an NP and a hardware chip.

The foregoing hardware chip may be one or a combination of the following chips: an application-specific integrated circuit (ASIC), a field-programmable gate array (FPGA), and a complex programmable logical device (CPLD).

The foregoing interface 801 is further configured to obtain, using the bus 802, the interface identifier transmitted by the signal processor 804, send the determined interface identifier to the access switching node through a control tunnel established between the controller and the access switching node, and instruct the access switching node to enable the interface corresponding to the interface identifier.

The foregoing interface 801 is further configured to receive the MAC address of the user terminal sent by the access switching node through the control tunnel, and the interface identifier of an interface on the access switching node connected to the user terminal, where the MAC address of the user terminal and the interface identifier of the interface on the access switching node connected to the user terminal are obtained by the access switching node when the user terminal establishes a connection with the interface on the access switching node, and sends a packet through the connected interface; and transmit the received MAC address and the received interface identifier to the signal processor 804 through the bus.

The signal processor 804 is further configured to obtain, using the bus 802, the MAC address and the interface identifier that are transmitted by the interface 801; establish a correspondence between the MAC address of the user terminal and the interface identifier according to the received MAC address of the user terminal and the received interface identifier; and transmit the established correspondence between the MAC address and the interface identifier to the memory 803 through the bus 802.

Figure 7A:
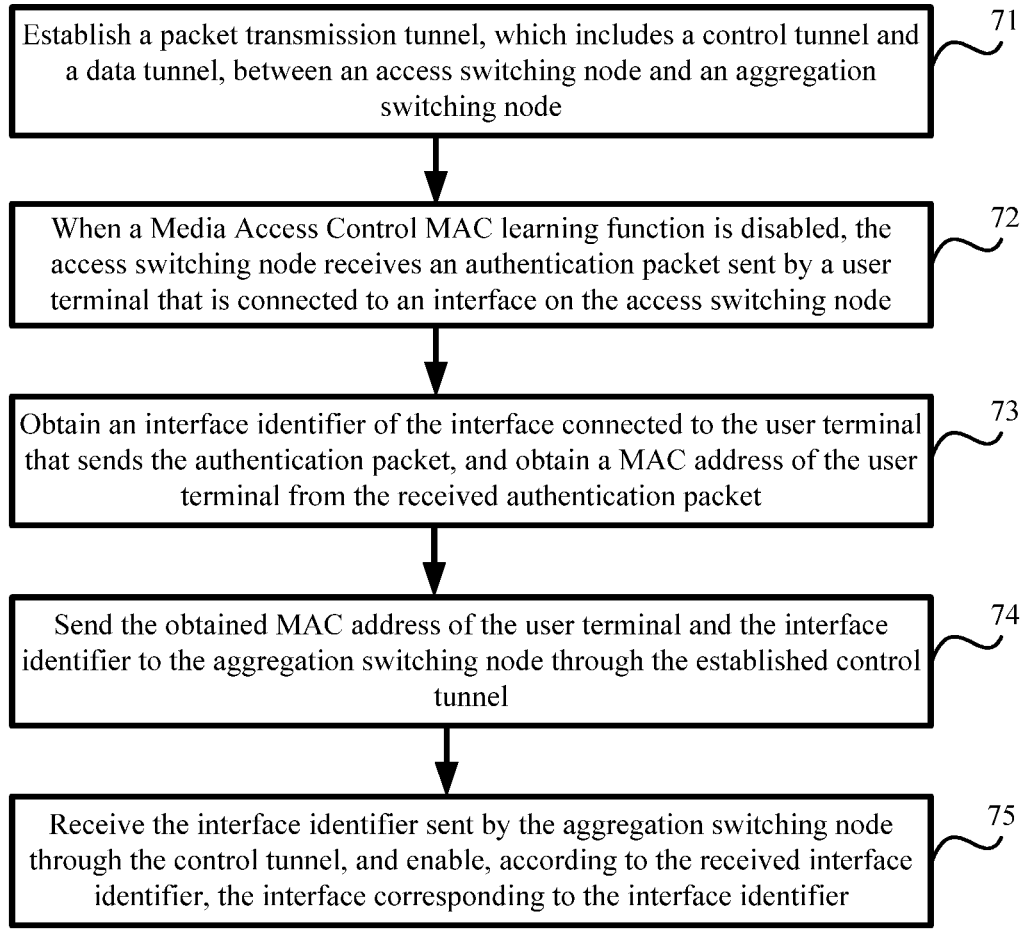
FIG. 7A is a flowchart of a method for controlling access of a user terminal according to Embodiment 3 of the present disclosure, where the method is applied to an access switching node side.

Correspondingly, based on the system architecture shown in FIG. 2 and for an access switching node, Embodiment 3 of the present disclosure provides a method for controlling access of a user terminal. As shown in FIG. 7A, a processing procedure of the method is as follows.

Step 71: Establish, between the access switching node and an aggregation switching node, a packet transmission tunnel that includes a control tunnel and a data tunnel.

The aggregation switching node may establish the packet transmission tunnel with the access switching node based on a proprietary protocol or based on extension of a standard protocol. In Embodiment 3 of the present disclosure, the packet transmission tunnel is established between the controller and the access switching node based on extension of the CAPWAP protocol.

For a process of establishing the packet transmission tunnel based on the CAPWAP protocol, refer to the detailed description in Embodiment 1, and details are not described in Embodiment 3 of the present disclosure again.

During a process of establishing the packet transmission tunnel between the aggregation switching node and the access switching node based on the CAPWAP protocol, the aggregation switching node maintains a correspondence between the established packet transmission tunnel and the access switching node. For example, it is assumed that the identifier of the access switching node is Switch 23, after a packet transmission tunnel 1 is established between the aggregation switching node and the access switching node whose identifier is Switch 23, the aggregation switching node may maintain a correspondence between the packet transmission tunnel 1 and Switch 23. In this way, when the access switching node whose identifier is Switch 23 sends a packet to the aggregation switching node through the established packet transmission tunnel subsequently, and when the aggregation switching node processes or responds to the packet, the aggregation switching node may determine, from the maintained correspondence between the packet transmission tunnel 1 and Switch 23, a device that sends the packet, a packet transmission channel through which the packet is sent, an access switching node to which the packet shall be transmitted, and a packet transmission channel through which response information shall be transmitted.

Step 72: When a MAC learning function is disabled, the access switching node receives an authentication packet sent by a user terminal that is connected to an interface on the access switching node.

Step 73: Obtain an interface identifier of the interface connected to the user terminal that sends the authentication packet, and obtain a MAC address of the user terminal from the received authentication packet.

The access switching node determines, using a signal processor that is capable of performing a processing function according to program code, the interface identifier of the interface connected to the user terminal that sends the authentication packet, and transmits the received authentication packet to the signal processor of the access switching node; and the signal processor obtains, from a source MAC address field of the authentication packet, the MAC address of the user terminal that sends the authentication packet.

Step 74: Send the obtained MAC address of the user terminal and the obtained interface identifier to the aggregation switching node through the established control tunnel.

Step 75: Receive the interface identifier sent by the aggregation switching node through the control tunnel, and enable, according to the received interface identifier, the interface corresponding to the interface identifier.

The interface identifier is an interface identifier that is determined, after the aggregation switching node successfully implements access authentication on the user terminal, from a maintained correspondence between the MAC address of the user terminal and the interface identifier of the interface on the access switching node connected to the user terminal, and is corresponding to the MAC address of the successfully-authenticated user terminal.

For an implementation manner of establishing, by the aggregation switching node, the correspondence between the identifier of the terminal and the interface identifier, refer to the detailed description in Embodiment 1 or Embodiment 2, and details are not described in Embodiment 3 of the present disclosure.

Optionally, the access switching node receives an access permission that is of the user terminal corresponding to the MAC address and is sent by the controller through the control tunnel; and configures or modifies, according to a received access permission sent by the aggregation switching node, the access permission of the interface that is on the access switching node and corresponding to the interface identifier, to control the user terminal, which is connected to the interface, to access a network according to the access permission.

Figure 7B:
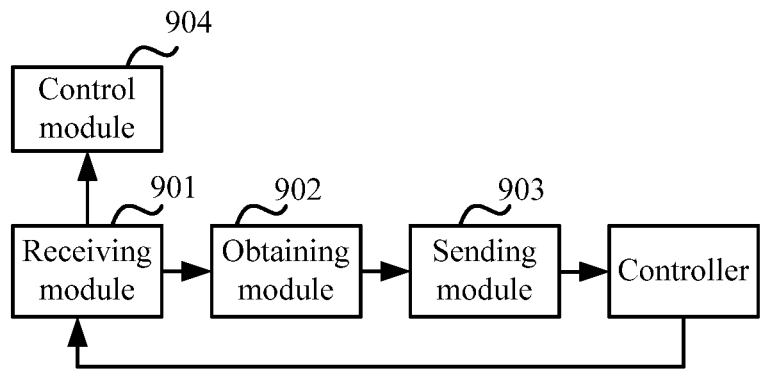
FIG. 7B is a schematic structural diagram of composition of an apparatus for controlling access of a user terminal according to Embodiment 3 of the present disclosure.

Correspondingly, Embodiment 3 of the present disclosure further provides an apparatus for controlling access of a user terminal. As shown in FIG. 7B, the apparatus includes a receiving module 901 configured to, when a MAC learning function is disabled, receive an authentication packet sent by a user terminal that is connected to an interface on an access switching node, and transmit the authentication packet to an obtaining module 902; the obtaining module 902 configured to receive the authentication packet transmitted by the receiving module 901, obtain an interface identifier of the interface connected to the user terminal that sends the authentication packet, obtain a MAC address of the user terminal from the received authentication packet, and transmit the interface identifier and the MAC address to a sending module 903; the sending module 903 configured to receive the interface identifier and the MAC address that are transmitted by the obtaining module 902, and send the obtained MAC address of the user terminal and the obtained interface identifier to a controller through a control tunnel established between the controller and the access switching node, such that the controller maintains a correspondence between the received MAC address of the user terminal and the received interface identifier; where the foregoing receiving module 901 is further configured to receive the interface identifier sent by the controller through the control tunnel, and transmit the interface identifier to a control module 904, where the interface identifier is an interface identifier that is determined from the correspondence between the MAC address of the user terminal and the interface identifier after the controller successfully implements access authentication on the user terminal corresponding to the MAC address, and is corresponding to the MAC address of the successfully-authenticated user terminal; and the control module 904 configured to obtain the interface identifier transmitted by the receiving module 901, and enable, according to the received interface identifier, the interface corresponding to the interface identifier.

The foregoing receiving module 901 is further configured to receive an access permission that is of the user terminal corresponding to the MAC address and is sent by the controller through the control tunnel, and transmit the access permission to the control module 904; and the control module 904 is configured to obtain the access permission transmitted by the receiving module 901, and configure or modify, according to a received access permission sent by an aggregation switching node, the access permission of the interface that is on the access switching node and corresponding to the interface identifier, to control the user terminal, which is connected to the interface, to access a network according to the access permission.

The foregoing obtaining module 902 includes a signal processor and is configured to determine the interface identifier of the interface connected to the user terminal that sends the authentication packet, and obtain the authentication packet transmitted by the receiving module; and the signal processor obtains, from a source MAC address field of the authentication packet, the MAC address of the user terminal that sends the authentication packet.

Figure 7C:
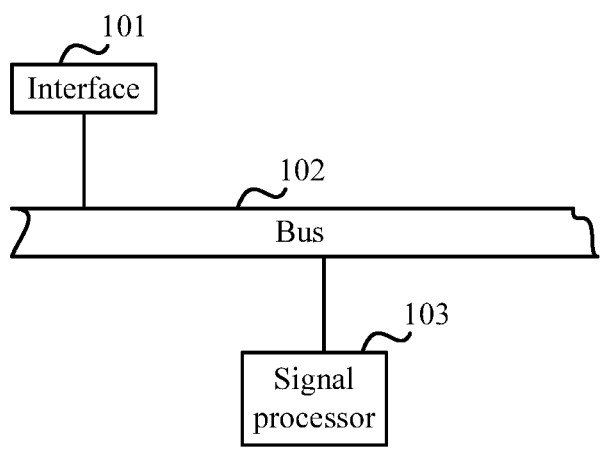
FIG. 7C is a schematic structural diagram of composition of a network switch according to Embodiment 3 of the present disclosure.

Correspondingly, Embodiment 3 of the present disclosure further provides a network switch. As shown in FIG. 7C, the network switch includes an interface 101 and a signal processor 103.

The interface 101 is configured to, when a MAC learning function is disabled, receive an authentication packet sent by a user terminal that is connected to an interface on an access switching node, and transmit the authentication packet to the signal processor 103 through a bus 102.

The interface 101 may be a NIC that provides a wired interface, for example, an Ethernet NIC that may provide a copper wire interface and/or a fiber interface.

The signal processor 103 is configured to receive, through the bus 102, the authentication packet transmitted by the interface 101, obtain an interface identifier of the interface connected to the user terminal that sends the authentication packet, obtain a MAC address of the user terminal from the received authentication packet, and transmit the interface identifier and the MAC address to the interface 101 through the bus 102.

The signal processor 103 may be a CPU, a combination of a CPU and a hardware chip, an NP, a combination of a CPU and an NP, or a combination of an NP and a hardware chip.

The foregoing hardware chip may be one or a combination of the following chips: ASIC, FPGA, CPLD, and the like.

Optionally, if the signal processor 103 is a CPU or a combination of components including a CPU, the network switch may further include a memory, where the memory is configured to store program code. The signal processor obtains the stored program code from the memory, and performs corresponding processing according to the obtained program code.

The memory may be a volatile memory, for example, a RAM; or a non-volatile memory, for example, a read-only memory (ROM), a flash memory, an HDD or an SSD; or a combination of memories of the foregoing types.

The foregoing interface 101 is further configured to receive, through the bus 102, the interface identifier and the MAC address that are transmitted by the signal processor 103, and send the obtained MAC address of the user terminal and the obtained interface identifier to a controller through an established control tunnel, such that the controller maintains a correspondence between the received MAC address of the user terminal and the received interface identifier.

The foregoing interface 101 is further configured to receive the interface identifier sent by the controller through the control tunnel, and transmit the interface identifier to the signal processor 103 through the bus 102, where the interface identifier is an interface identifier that is determined from the correspondence between the MAC address of the user terminal and the interface identifier after the controller successfully implements access authentication on the user terminal corresponding to the MAC address, and is corresponding to the MAC address of the successfully-authenticated user terminal.

The signal processor 103 is configured to obtain, using the bus 102, the interface identifier transmitted by the interface 101, and enable, according to the received interface identifier, the interface corresponding to the interface identifier.

The interface 101 is further configured to receive an access permission that is of the user terminal corresponding to the MAC address and is sent by the controller through the control tunnel, and transmit the access permission to the signal processor 103 through the bus 102. The signal processor 103 is configured to obtain the access permission transmitted by the interface 101 through the bus 102, and configure or modify, according to a received access permission, the access permission of the interface that is on the access switching node and corresponding to the interface identifier, to control the user terminal, which is connected to the interface, to access a network according to the access permission.

The foregoing signal processor 103 is configured to determine the interface identifier of the interface connected to the user terminal that sends the authentication packet, and obtain the authentication packet transmitted by the interface 101; and the signal processor 103 obtains, from a source MAC address field of the authentication packet, the MAC address of the user terminal that sends the authentication packet.

In the technical solutions provided in the foregoing embodiments of the present disclosure, centralized control on access of user terminals can be implemented on an aggregation switching node, and distributed policy control can be implemented on an access switching node, to control data forwarding functions of user terminals at an access layer while implementing centralized management of the user terminals. In this way, an implementation manner is relatively easy, a system architecture is relatively simple, and network security can be further improved.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical read-only memory, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specified function in one or more procedures in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more procedures in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

What is claimed is:

1. A method for controlling access of a user terminal, comprising:

receiving, by a controller, an authentication packet sent by an access switching node through an established data tunnel;

obtaining, by the controller, a media access control (MAC) address in a source MAC address field of the authentication packet;

determining, from a maintained correspondence between a MAC address of a user terminal and an interface identifier, an interface identifier corresponding to the MAC address of the successfully-authenticated user terminal after access authentication implemented on a user terminal corresponding to the obtained MAC address succeeds, wherein the interface identifier is an interface identifier of an interface on the access switching node connected to the user terminal; and sending, by the controller, the determined interface identifier to the access switching node through a control tunnel established between the controller and the access switching node, and instructing the access switching node to enable the interface corresponding to the interface identifier.

2. The method according to claim 1, wherein before the access authentication is implemented on the user terminal corresponding to the MAC address, the correspondence between the MAC address of the user terminal and the interface identifier is determined in the following manner:

receiving, by the controller, the MAC address of the user terminal sent by the access switching node through the control tunnel, and the interface identifier of the interface on the access switching node connected to the user terminal, wherein the MAC address of the user terminal and the interface identifier of the interface on the access switching node connected to the user terminal are obtained by the access switching node when the user terminal establishes a connection with the interface on the access switching node, and sends a packet through the connected interface; and establishing a correspondence between the MAC address of the user terminal and the interface identifier according to the received MAC address of the user terminal and the received interface identifier.

3. A method for controlling access of a user terminal, comprising:

receiving, by an access switching node, an authentication packet sent by a user terminal that is connected to an interface on the access switching node, wherein a media access control (MAC) learning function of the access switching node is disabled;

obtaining, by the access switching node, an interface identifier of the interface connected to the user terminal that sends the authentication packet, and obtaining a MAC address of the user terminal from the received authentication packet;

sending, by the access switching node, the obtained MAC address of the user terminal and the obtained interface identifier to a controller through an established control tunnel, such that the controller maintains a correspondence between the received MAC address of the user terminal and the received interface identifier;

receiving, by the access switching node, the interface identifier sent by the controller through the control tunnel, wherein the interface identifier is an interface identifier that is determined from the correspondence between the MAC address of the user terminal and the interface identifier after the controller successfully implements access authentication on the user terminal corresponding to the MAC address, and is corresponding to the MAC address of the successfully-authenticated user terminal; and enabling, by the access switching node according to the received interface identifier, the interface corresponding to the interface identifier.

4. The method according to claim 3, further comprising receiving, by the access switching node, a first access permission that is of the user terminal corresponding to the MAC address and is sent by the controller through the control tunnel, wherein enabling, by the access switching node according to the received interface identifier, the interface corresponding to the interface identifier comprises configuring or modifying, according to the first access permission, a second access permission of the interface that is on the access switching node and corresponding to the interface identifier, to control the user terminal, which is connected to the interface, to access a network according to the second access permission.

5. The method according to claim 3, wherein obtaining, by the access switching node, the interface identifier of the interface connected to the user terminal that sends the authentication packet, and obtaining the MAC address of the user terminal from the received authentication packet comprises:

determining, by the access switching node, using a signal processor that is capable of performing a processing function according to program code, the interface identifier of the interface connected to the user terminal that sends the authentication packet, and transmitting the received authentication packet to the signal processor of the access switching node; and obtaining, by the signal processor from a source MAC address field of the authentication packet, the MAC address of the user terminal that sends the authentication packet.

6. The method according to claim 4, wherein obtaining, by the access switching node, the interface identifier of the interface connected to the user terminal that sends the authentication packet, and obtaining the MAC address of the user terminal from the received authentication packet comprises:

determining, by the access switching node, using a signal processor that is capable of performing a processing function according to program code, the interface identifier of the interface connected to the user terminal that sends the authentication packet, and transmitting the received authentication packet to the signal processor of the access switching node; and obtaining, by the signal processor from a source MAC address field of the authentication packet, the MAC address of the user terminal that sends the authentication packet.

7. A network switch, comprising:
an interface;
a memory; and
a signal processor,
wherein the interface is configured to:
  receive an authentication packet sent through an established data tunnel; and
  transmit the received authentication packet to the signal processor through a bus, wherein the memory is configured to:
  store program code;
  store a correspondence between a media access control (MAC) address of a user terminal and an interface identifier; and
  transmit the stored program code to the signal processor through the bus, wherein the signal processor is configured to:
  obtain, using the bus, the program code stored in the memory; and
  execute the following according to the obtained program code:
    obtaining the MAC address in a source MAC address field of the authentication packet;
    implementing access authentication on the user terminal corresponding to the MAC address;
    obtaining the correspondence between the MAC address of the user terminal and the interface identifier that is stored in the memory after the access authentication succeeds;
    determining, from the obtained correspondence between the MAC address of the user terminal and the interface identifier, an interface identifier corresponding to the MAC address of the successfully-authenticated user terminal, wherein the interface identifier is an interface identifier of the interface on an access switching node connected to the user terminal; and
    transmitting the interface identifier to the interface through the bus, and wherein the interface is configured to:
  obtain, using the bus, the interface identifier transmitted by the signal processor; and
  send the interface identifier to the access switching node through a control tunnel established between the controller and the access switching node, to instruct the access switching node to enable the interface corresponding to the interface identifier.

8. The network switch according to claim 7, wherein the interface is further configured to:
  receive the MAC address of the user terminal sent by the access switching node through the control tunnel and the interface identifier of the interface on the access switching node connected to the user terminal, wherein the MAC address of the user terminal and the interface identifier of the interface on the access switching node connected to the user terminal are obtained by the access switching node when the user terminal establishes a connection with the interface on the access switching node and sends a packet through the connected interface; and
  transmit the received MAC address and the received interface identifier to the signal processor through the bus, and wherein the signal processor is further configured to:
  obtain, using the bus, the MAC address of the user terminal and the interface identifier that are transmitted by the interface;
  establish a correspondence between the MAC address of the user terminal and the interface identifier according to the MAC address of the user terminal and the interface identifier; and
  transmit the established correspondence between the MAC address of the user terminal and the interface identifier to the memory through the bus.

9. A network switch, comprising:
an interface; and
a signal processor,
wherein the interface is configured to:
  receive an authentication packet sent by a user terminal connected to the interface; and
  transmit the authentication packet to the signal processor through a bus, wherein a media access control (MAC) learning function of the interface is disabled,
wherein the signal processor configured to:
  receive, through the bus, the authentication packet transmitted by the interface;
  obtain an interface identifier of the interface connected to the user terminal that sends the authentication packet;
  obtain a MAC address of the user terminal from the received authentication packet; and
  transmit the interface identifier and the MAC address of the user terminal to the interface through the bus,
wherein the interface is configured to:
  receive, through the bus, the interface identifier and the MAC address of the user terminal that are transmitted by the signal processor;
  send the obtained MAC address of the user terminal and the obtained interface identifier to a controller through an established control tunnel;
  receive, through the bus, the interface identifier sent by the controller through the control tunnel; and
  transmit the interface identifier to the signal processor through the bus, wherein the interface identifier is an interface identifier that is determined from a correspondence between the MAC address of the user terminal and the interface identifier after the controller successfully implements access authentication on the user terminal corresponding to the MAC address, and is corresponding to the MAC address of the successfully-authenticated user terminal, and
wherein the signal processor is configured to:
  obtain, using the bus, the interface identifier transmitted by the interface; and
  enable, according to the received interface identifier, the interface corresponding to the interface identifier.

10. The network switch according to claim 9, wherein the interface is further configured to:
  receive a first access permission that is of the user terminal corresponding to the MAC address and is sent by the controller through the control tunnel; and
  transmit the first access permission to the signal processor through the bus, and
wherein the signal processor being configured to enable the interface corresponding to the interface identifier comprises:
  obtaining the first access permission that is transmitted by the interface through the bus; and
  configuring or modifying, according to the received first access permission, a second access permission of the interface corresponding to the interface identifier, to control the user terminal, which is connected to the interface, to access a network according to the second access permission.

* * * * *